INVENTORS.
JOHN W. CARNER
FRANK B. ANDERSON
BY Huebner & Worrel
ATTORNEYS.

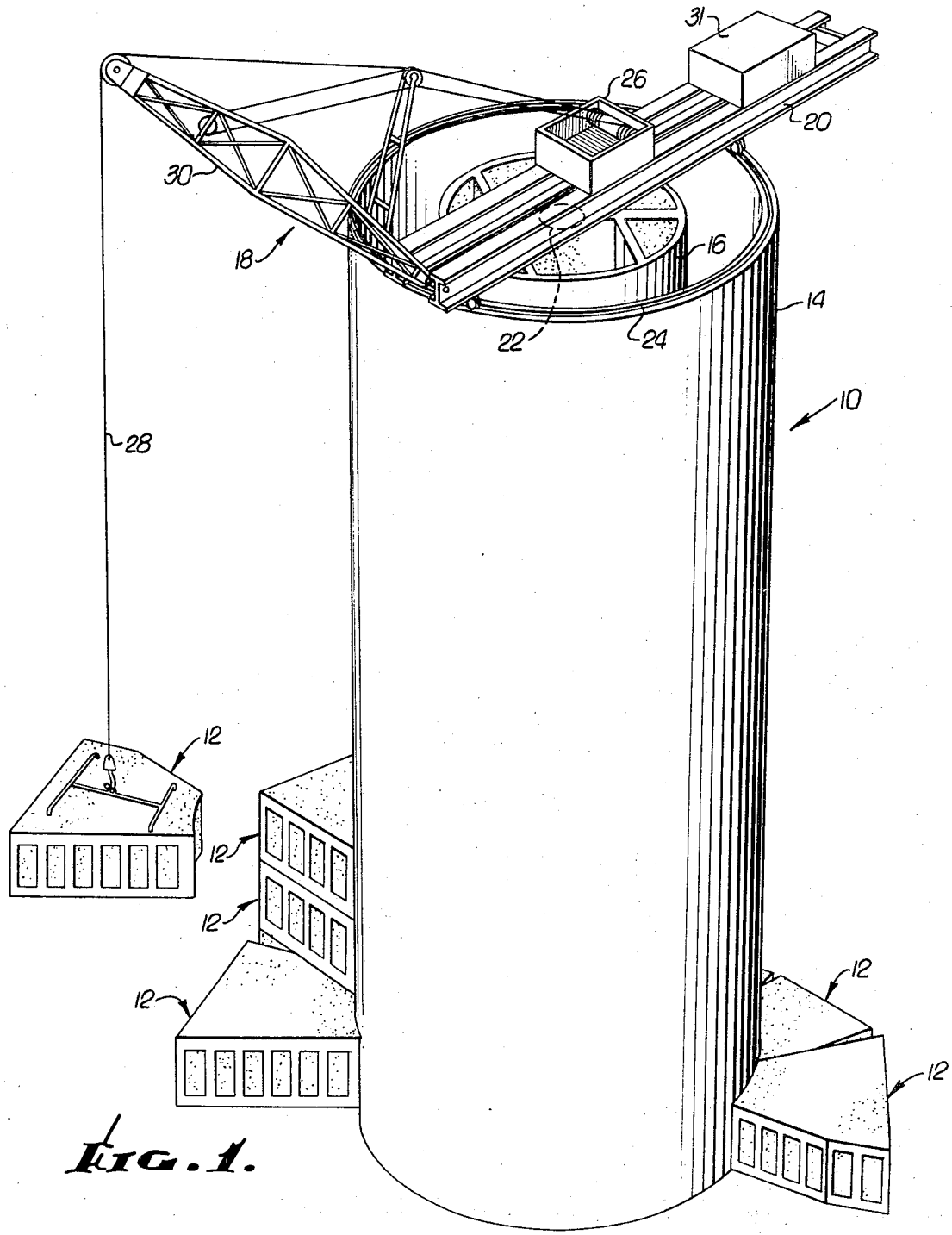

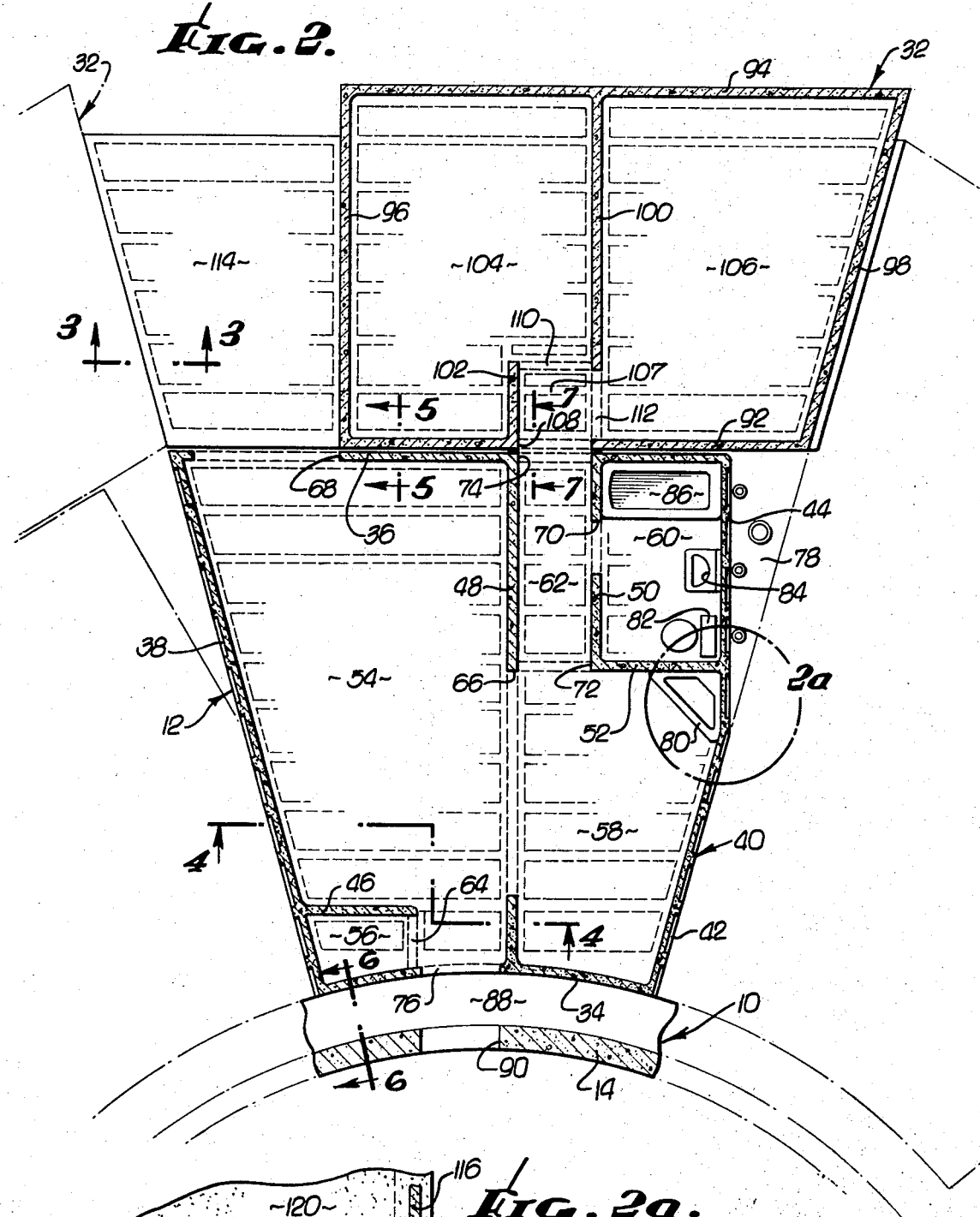

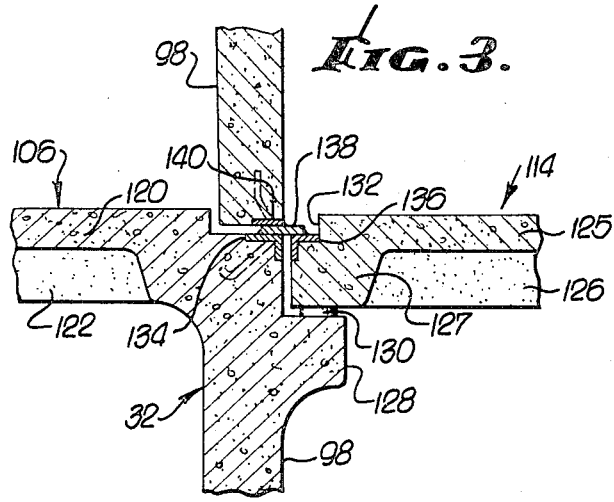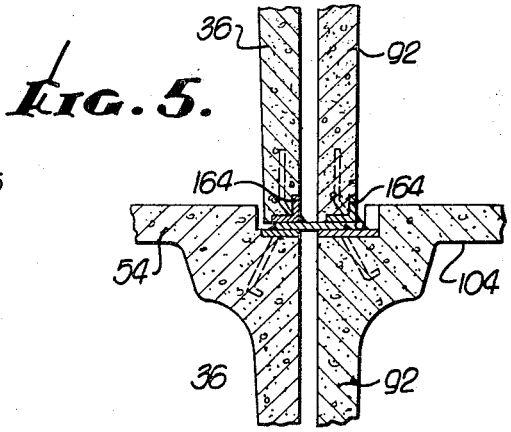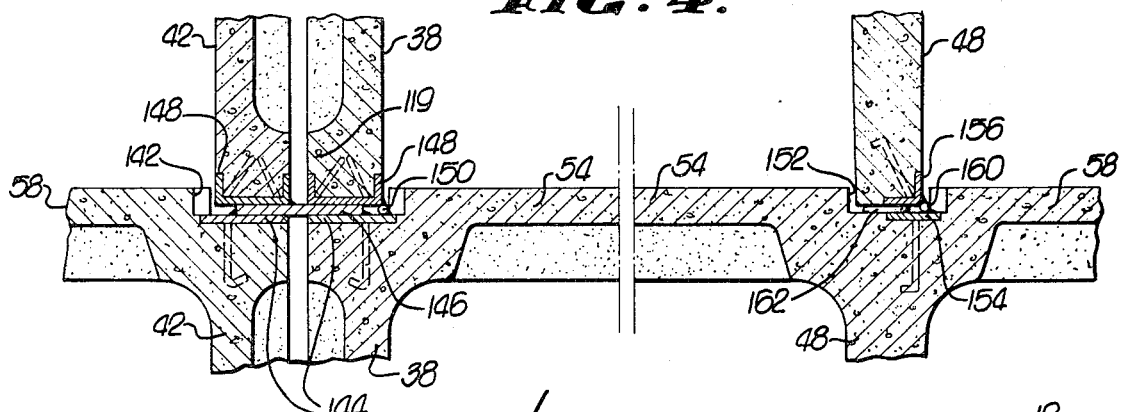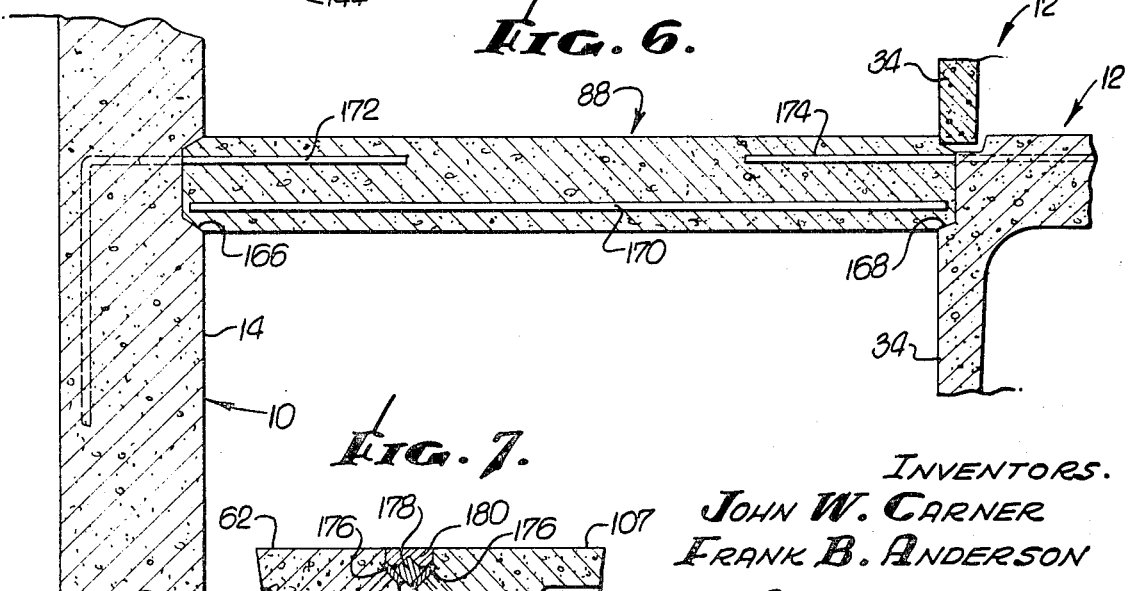

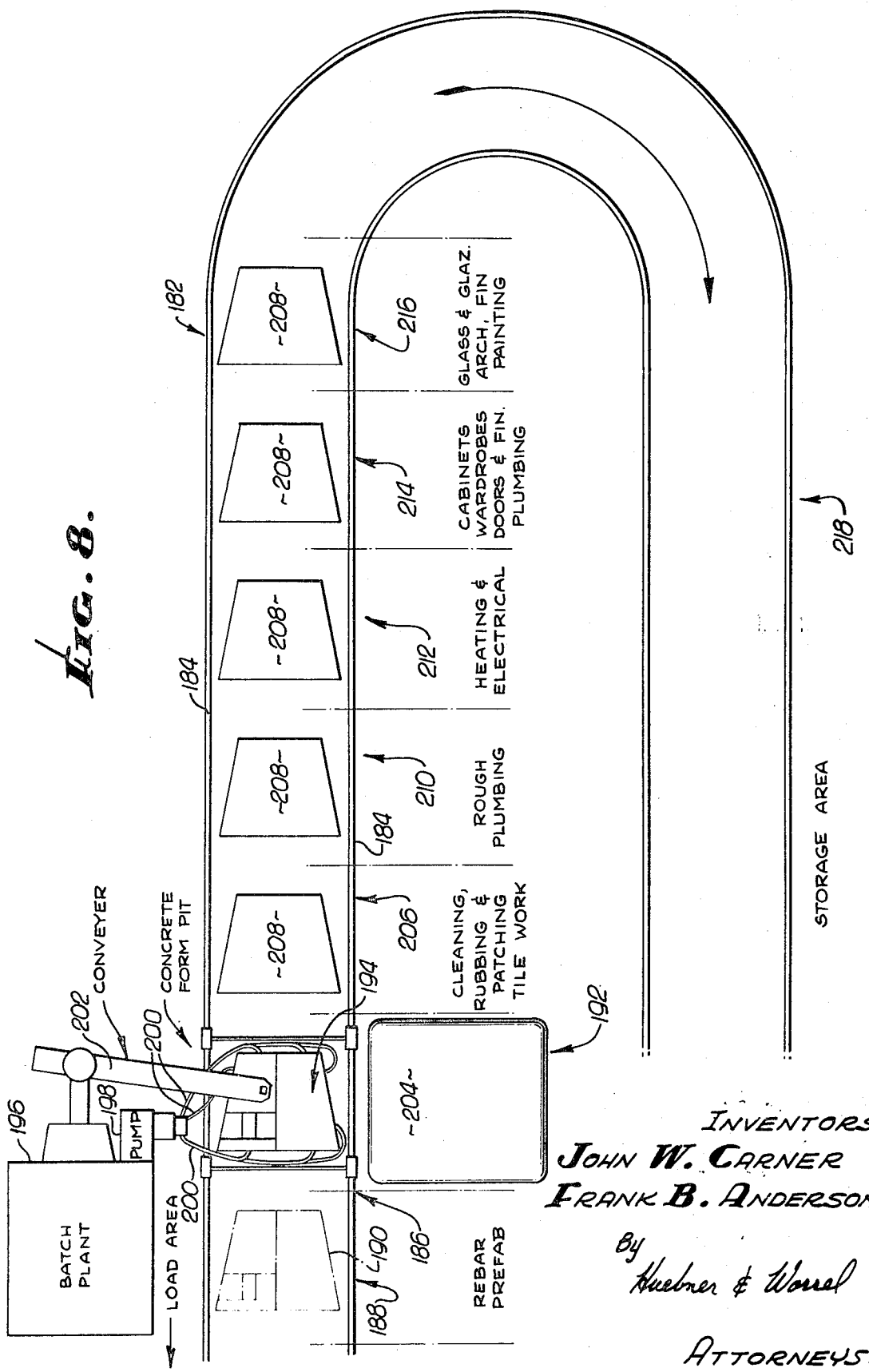

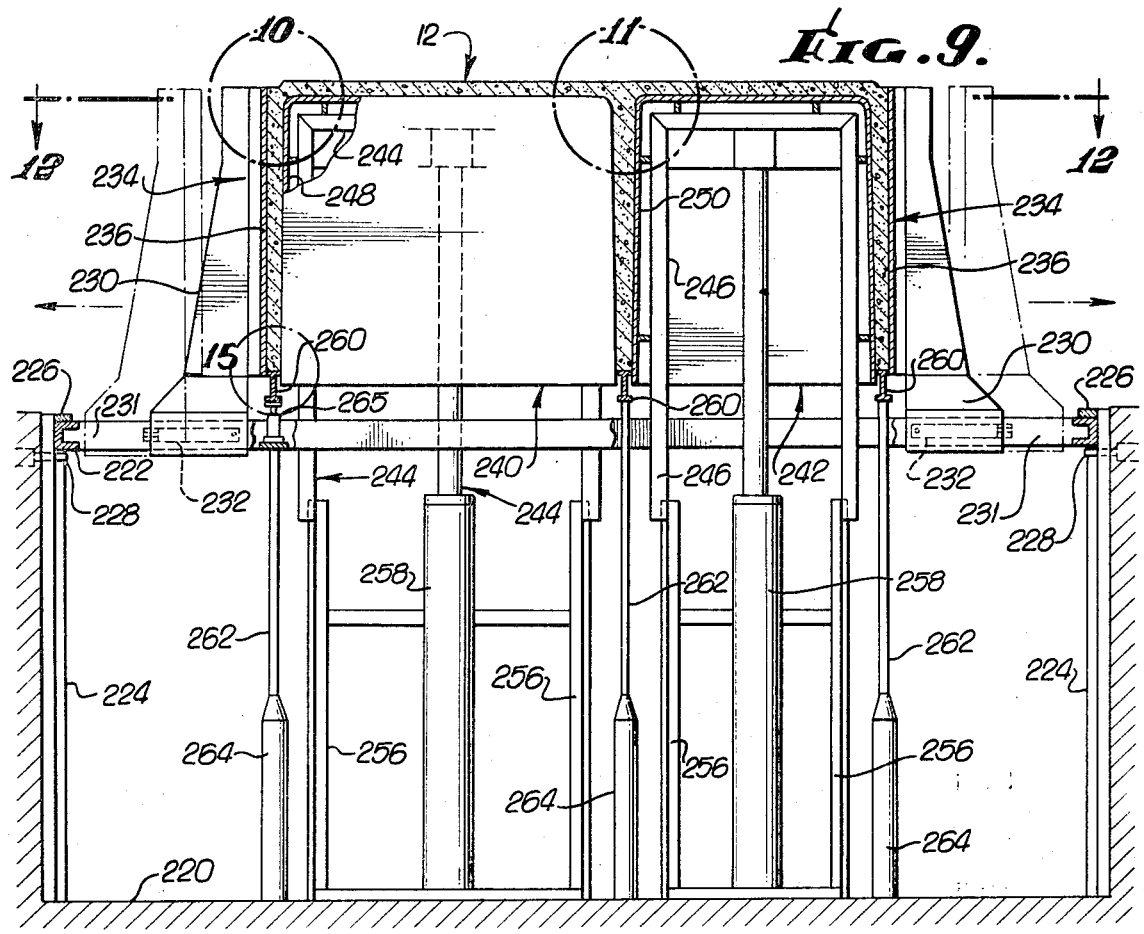
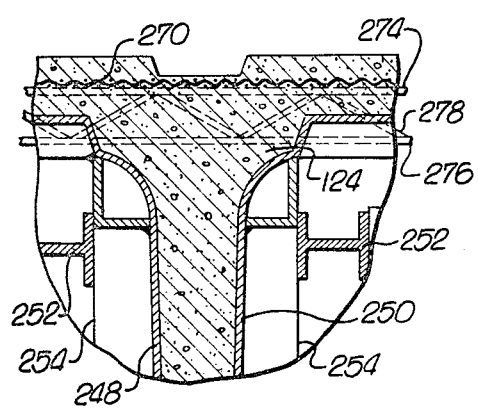
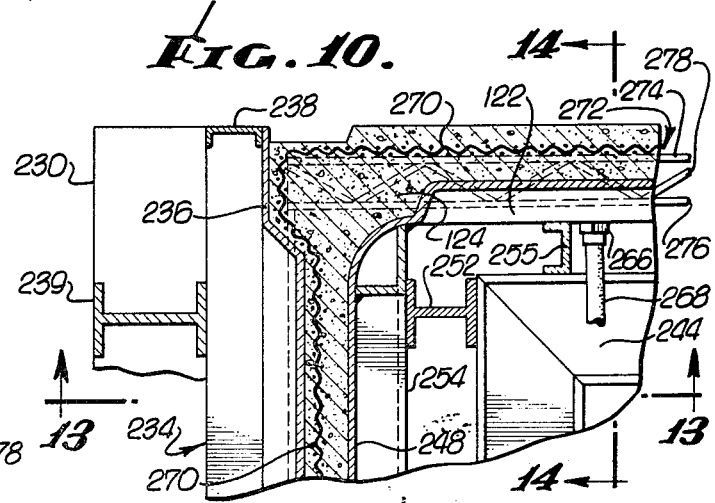

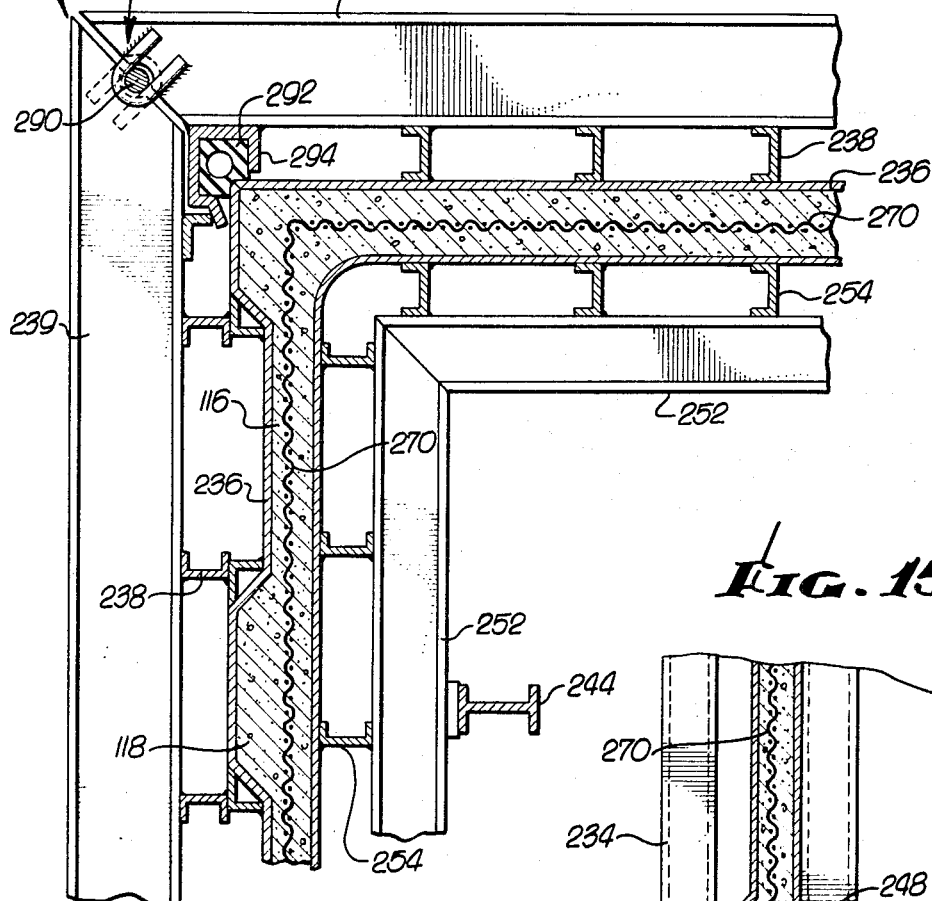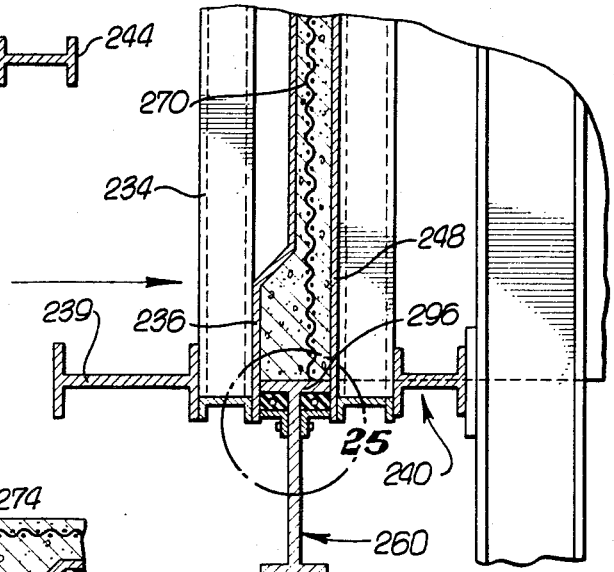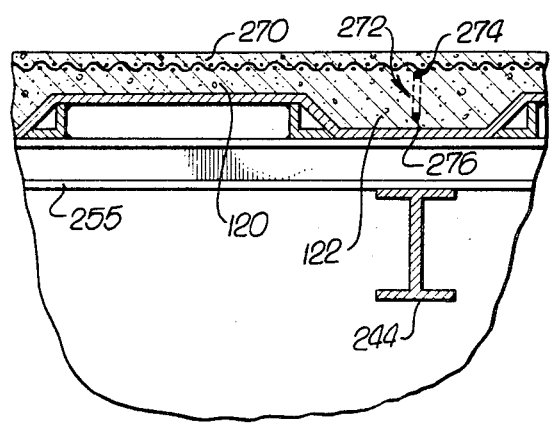

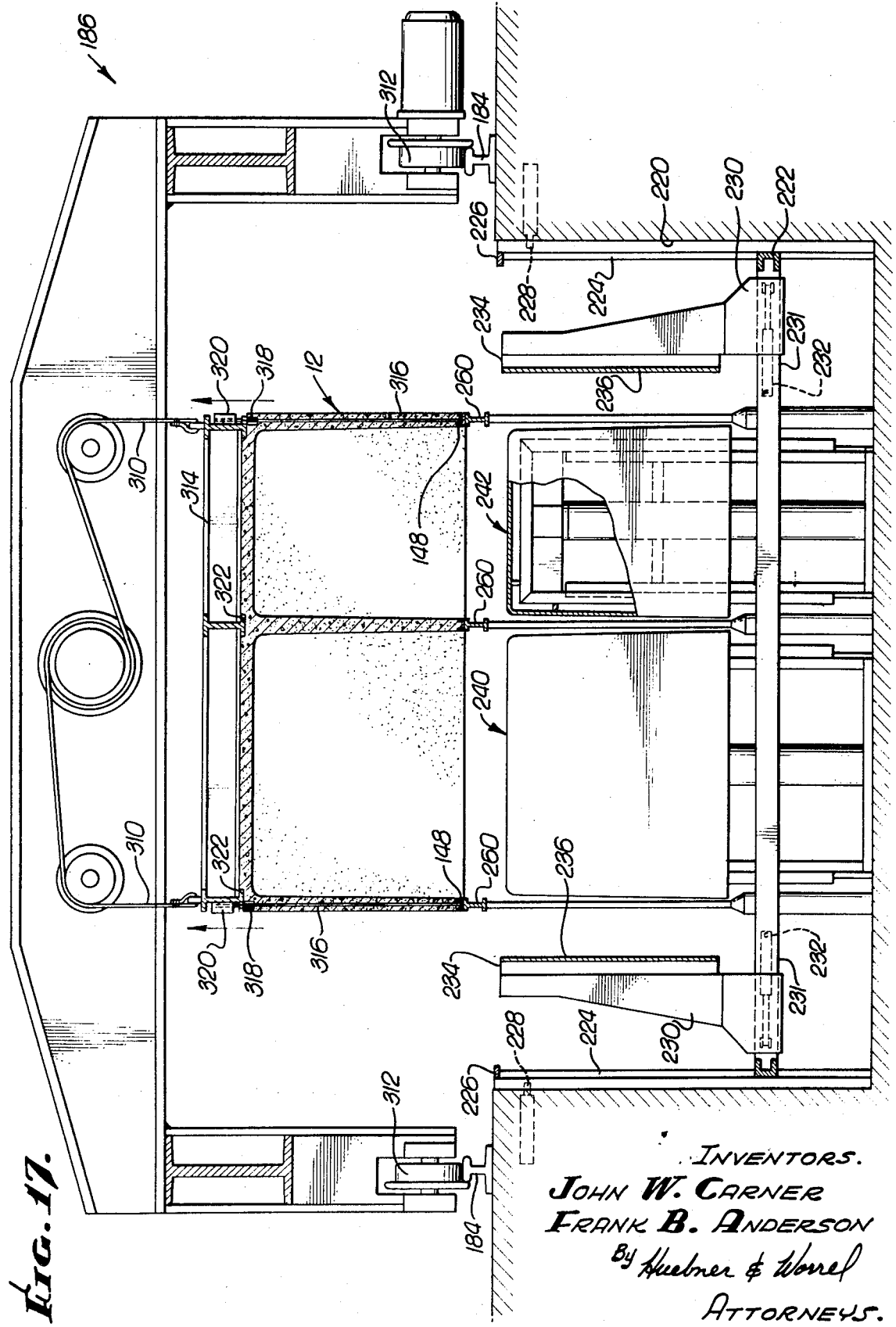

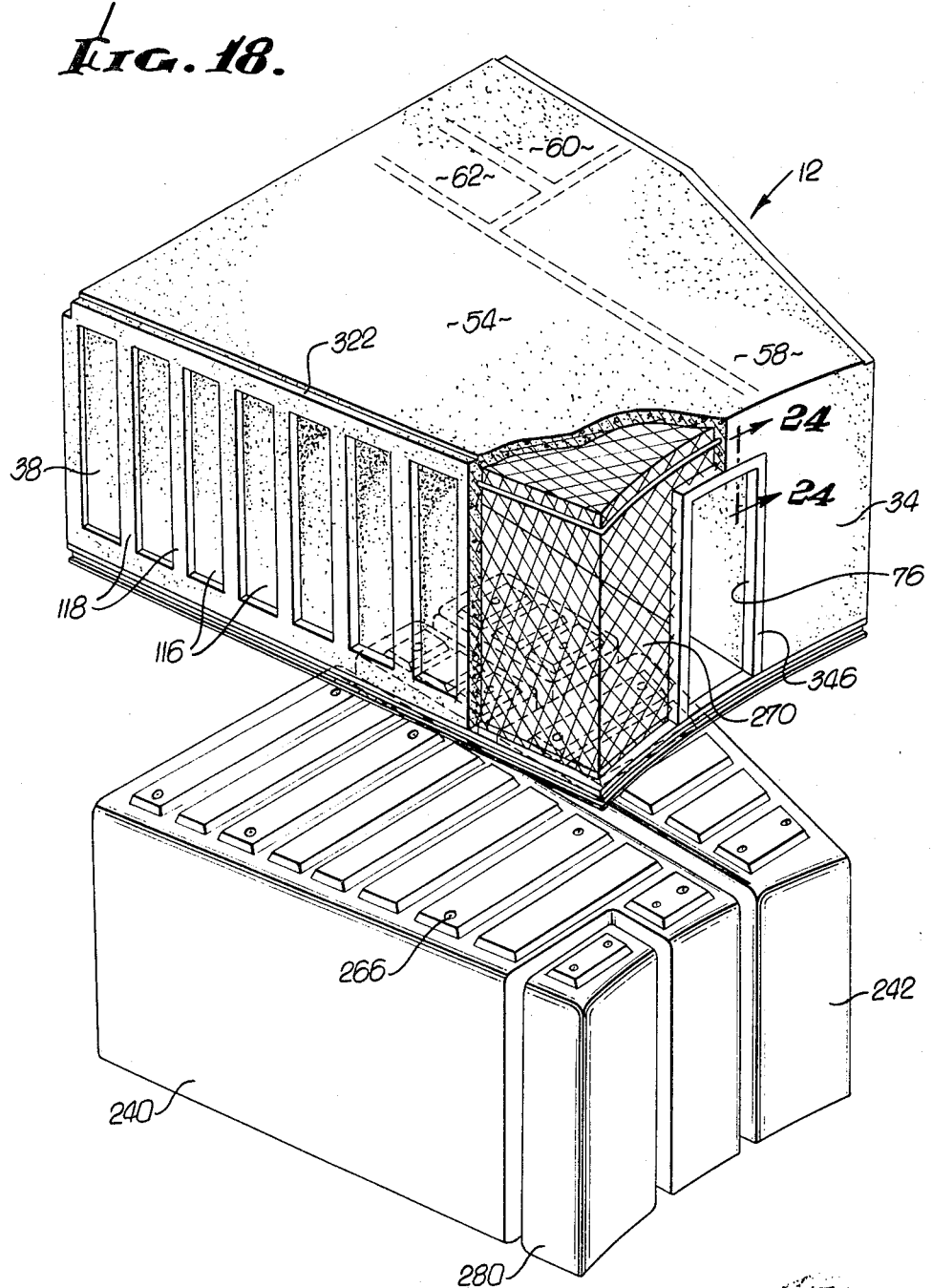

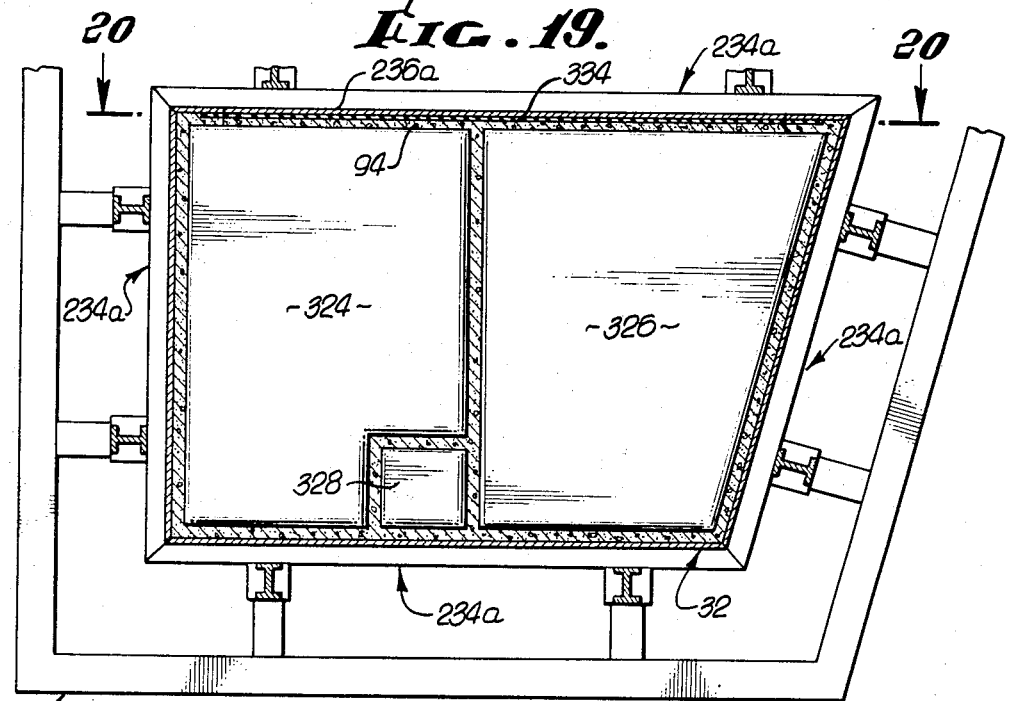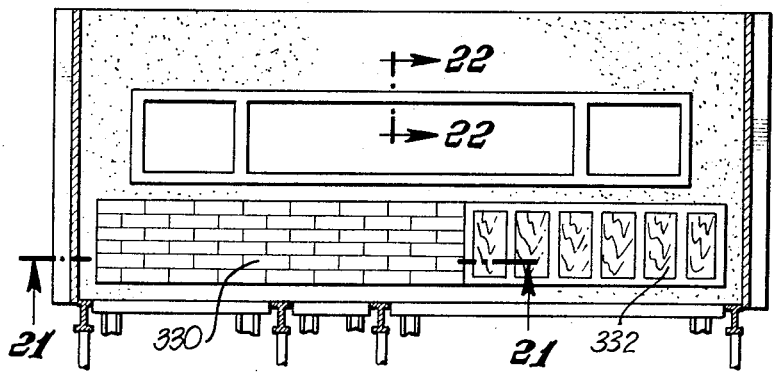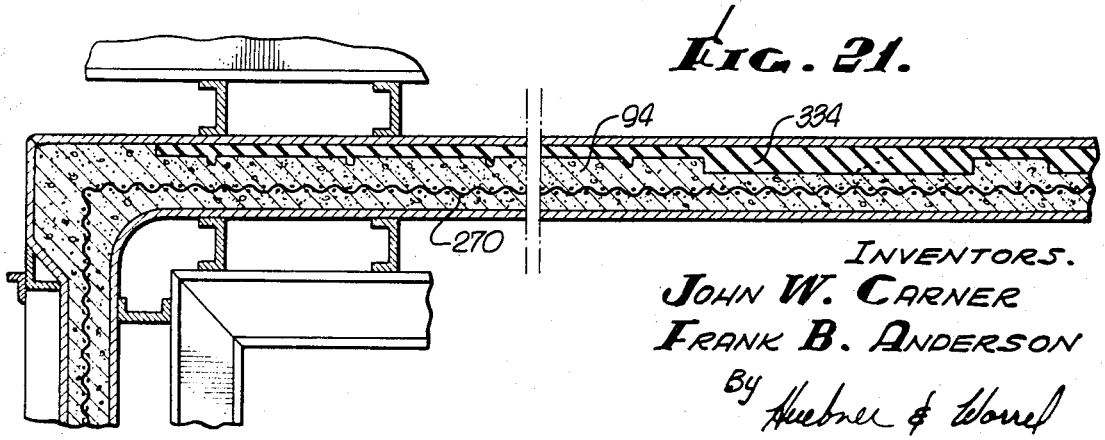

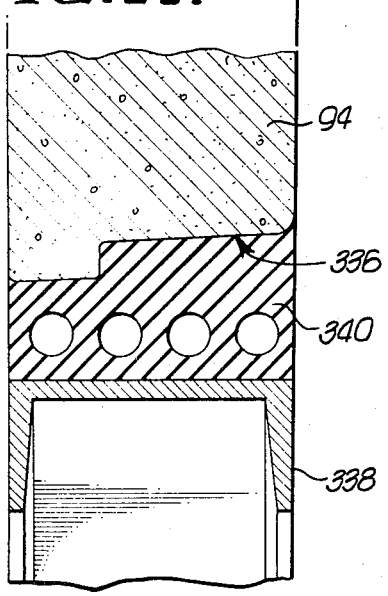
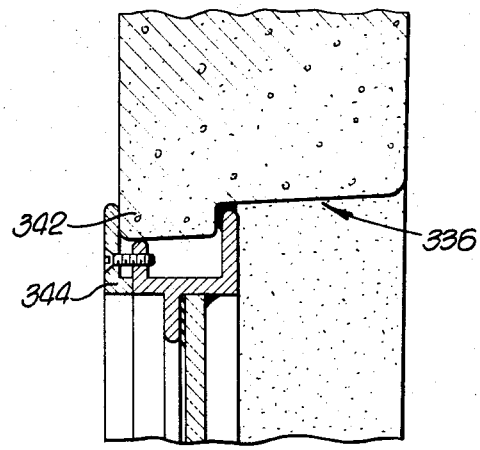
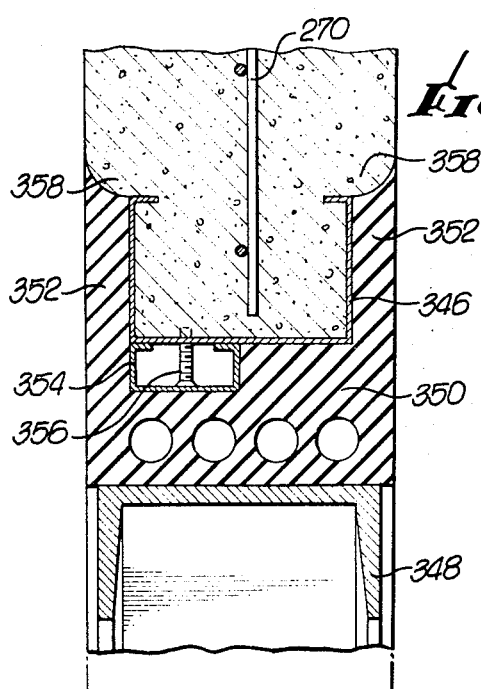
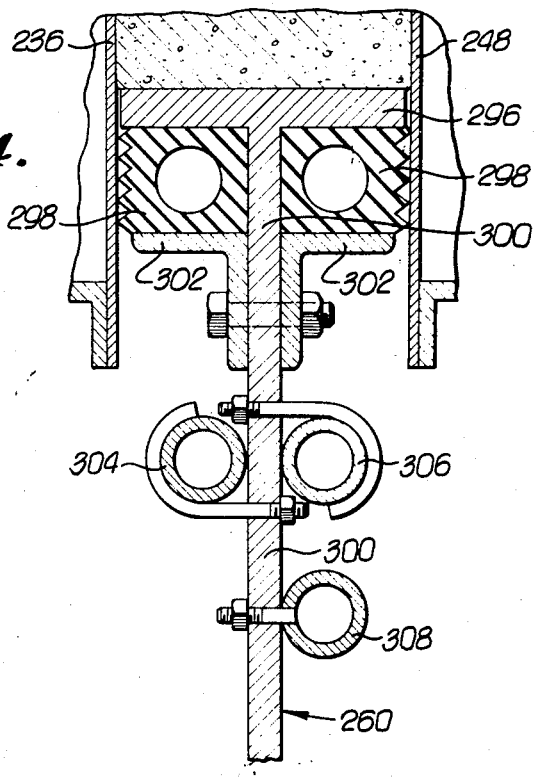
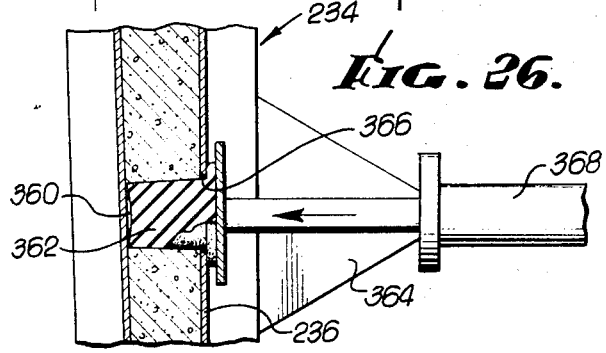

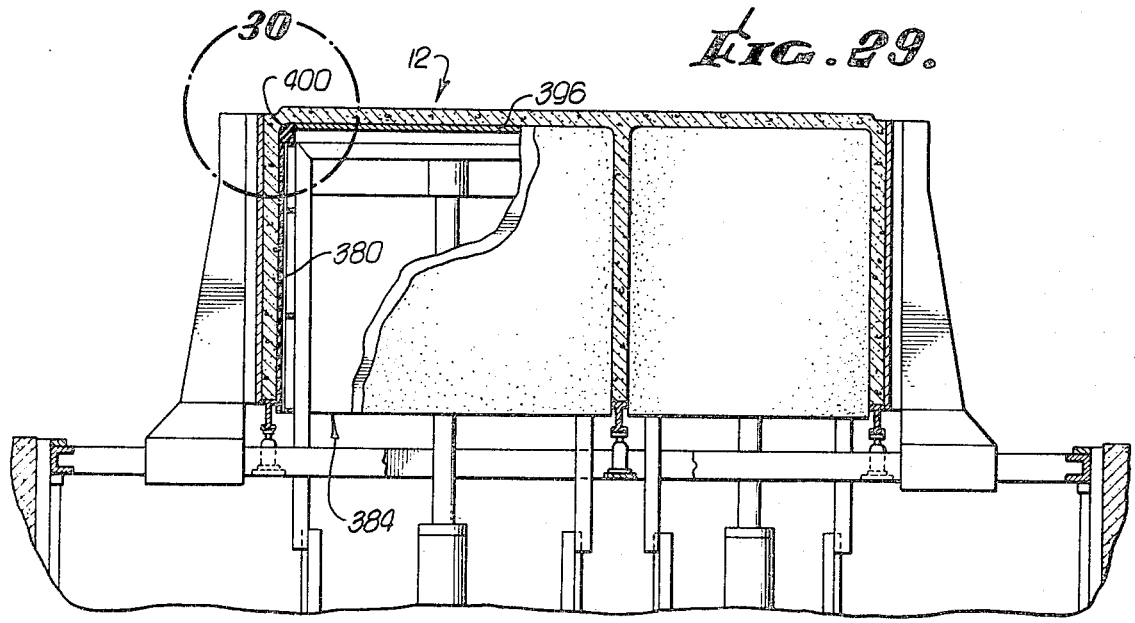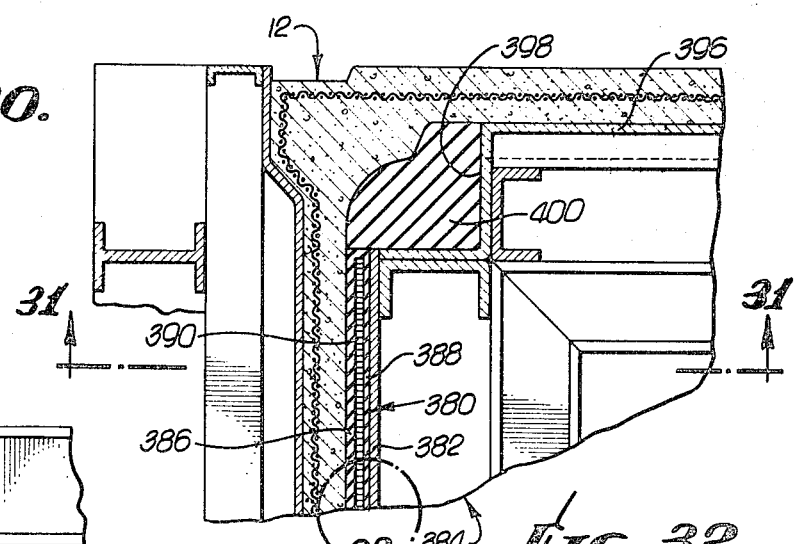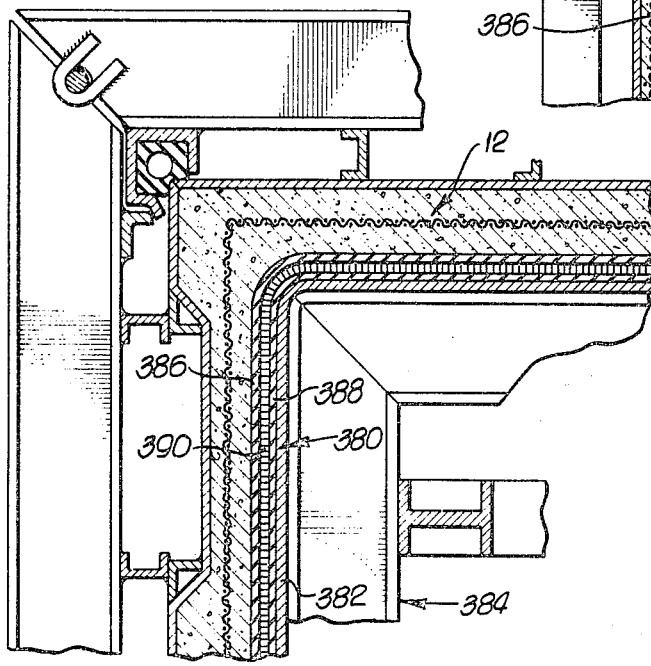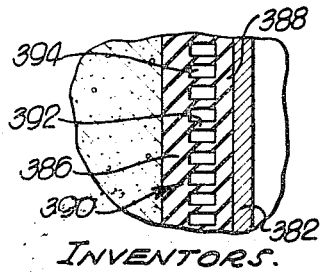

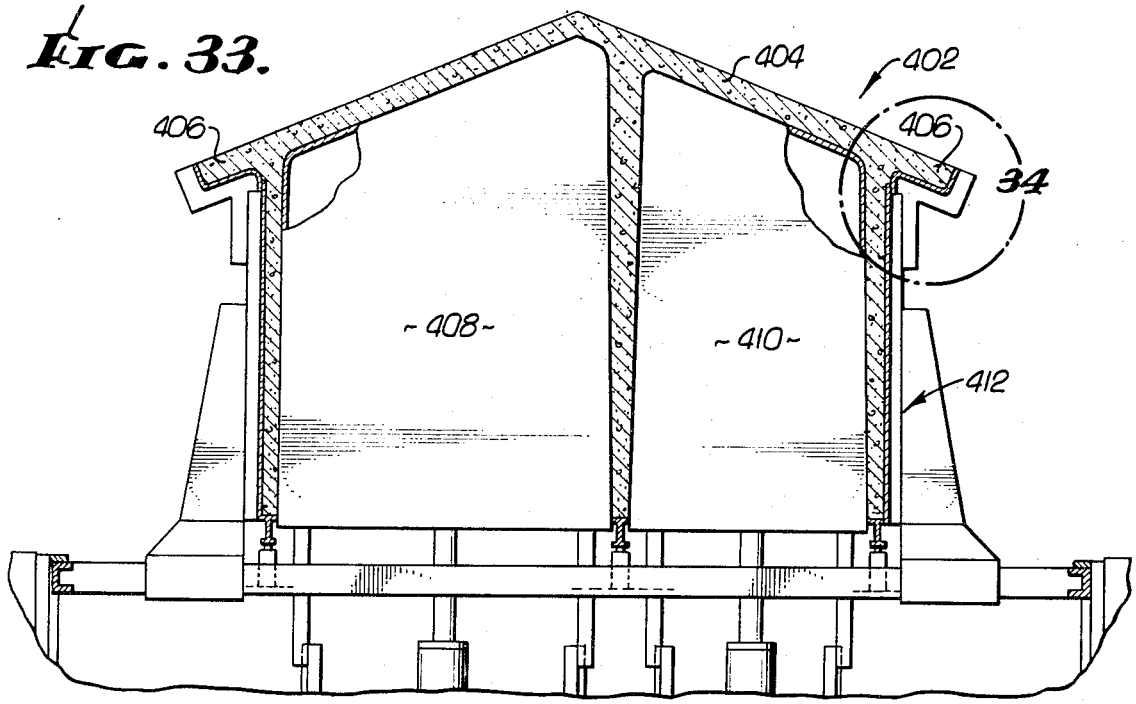
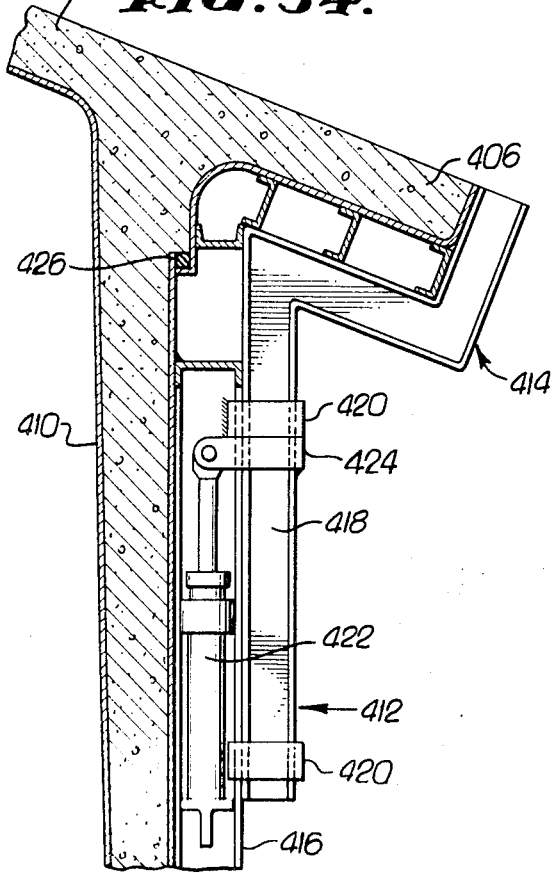
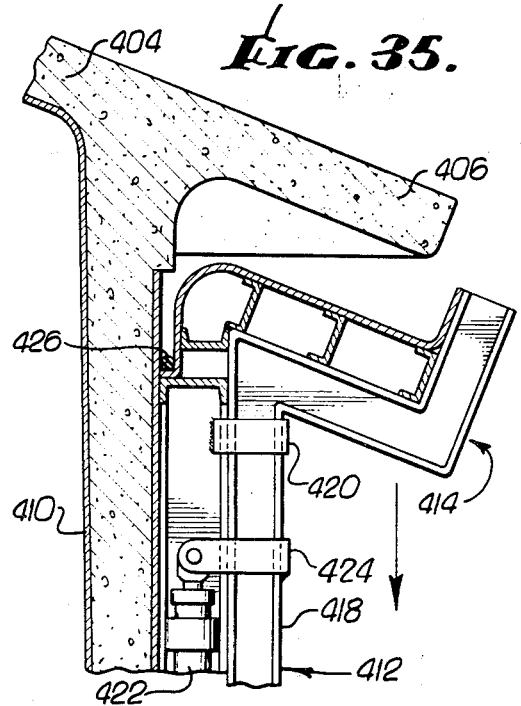

Jan. 30, 1973   J. W. CARNER ET AL   3,714,304
BUILDING CONSTRUCTION
Filed Dec. 29, 1969   20 Sheets-Sheet 15

INVENTORS.
JOHN W. CARNER
FRANK B. ANDERSON
By
Huebner & Worrel
ATTORNEYS.

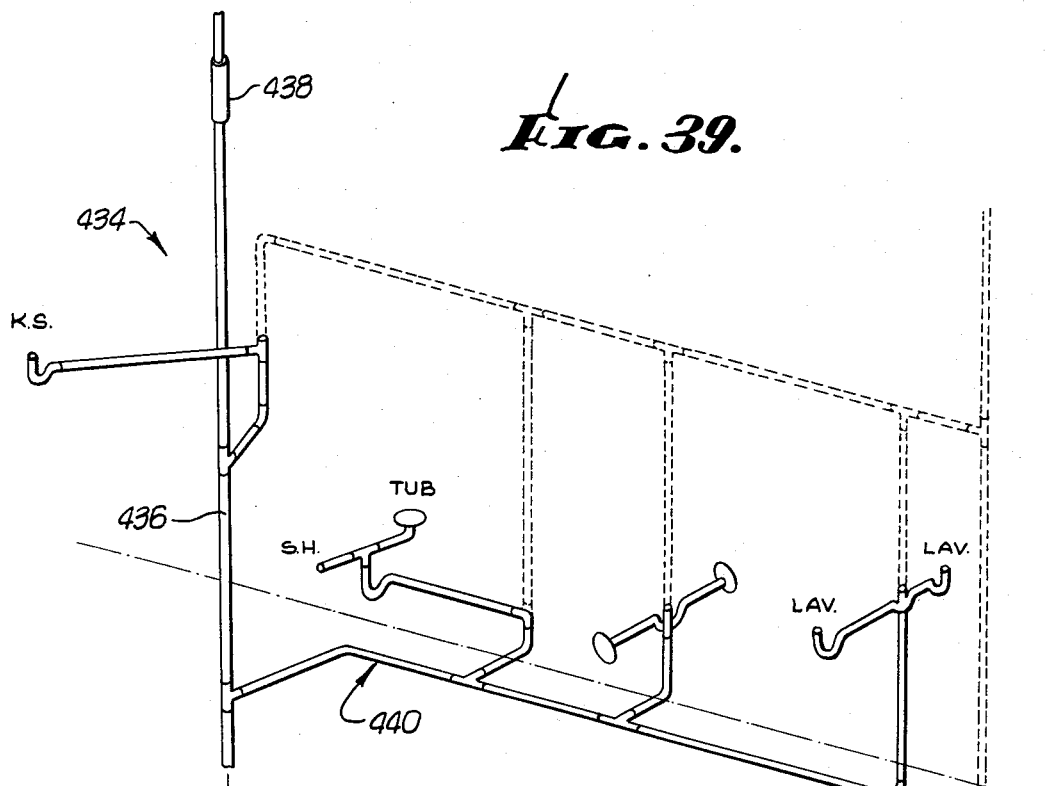
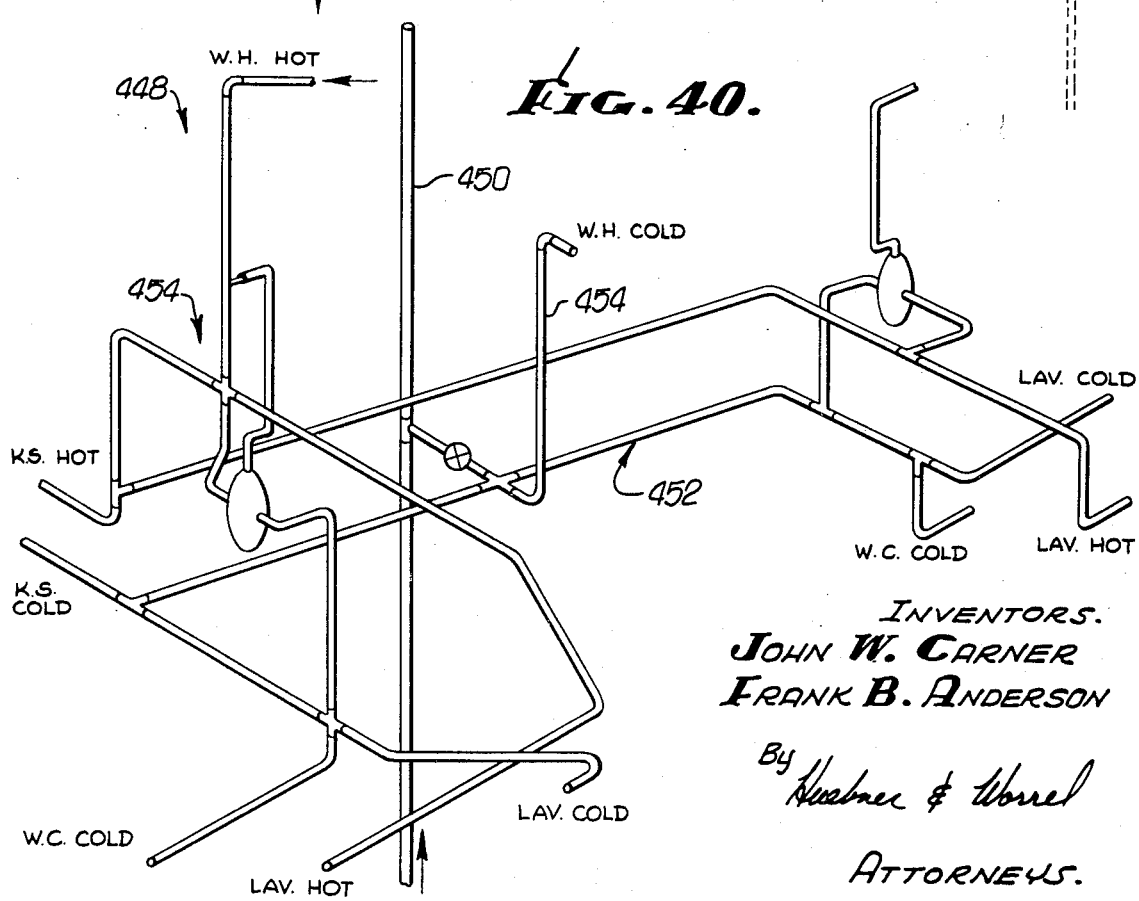

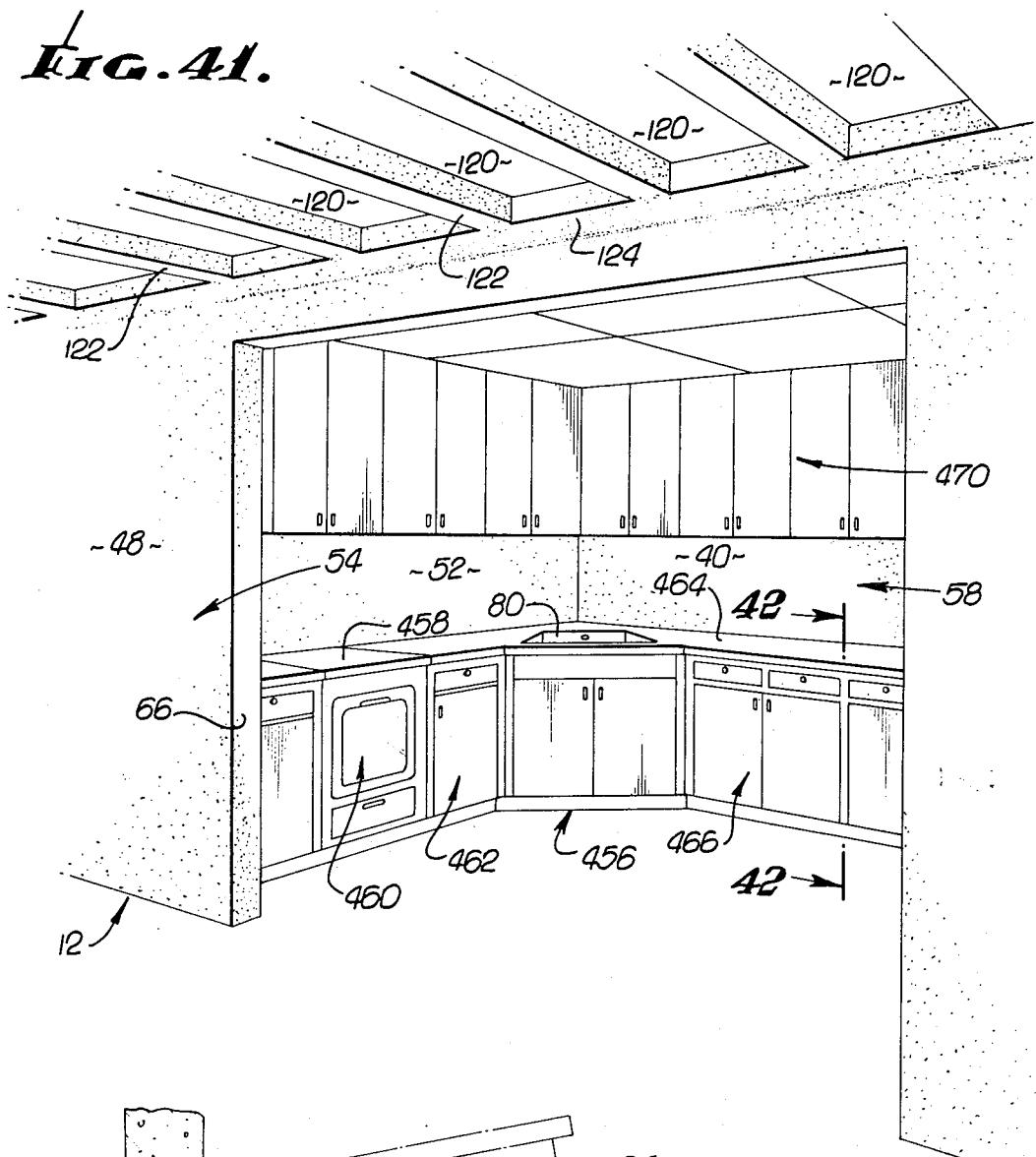
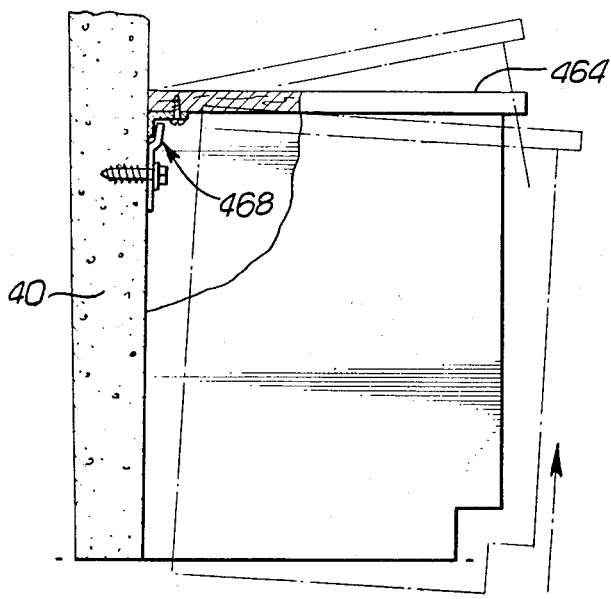

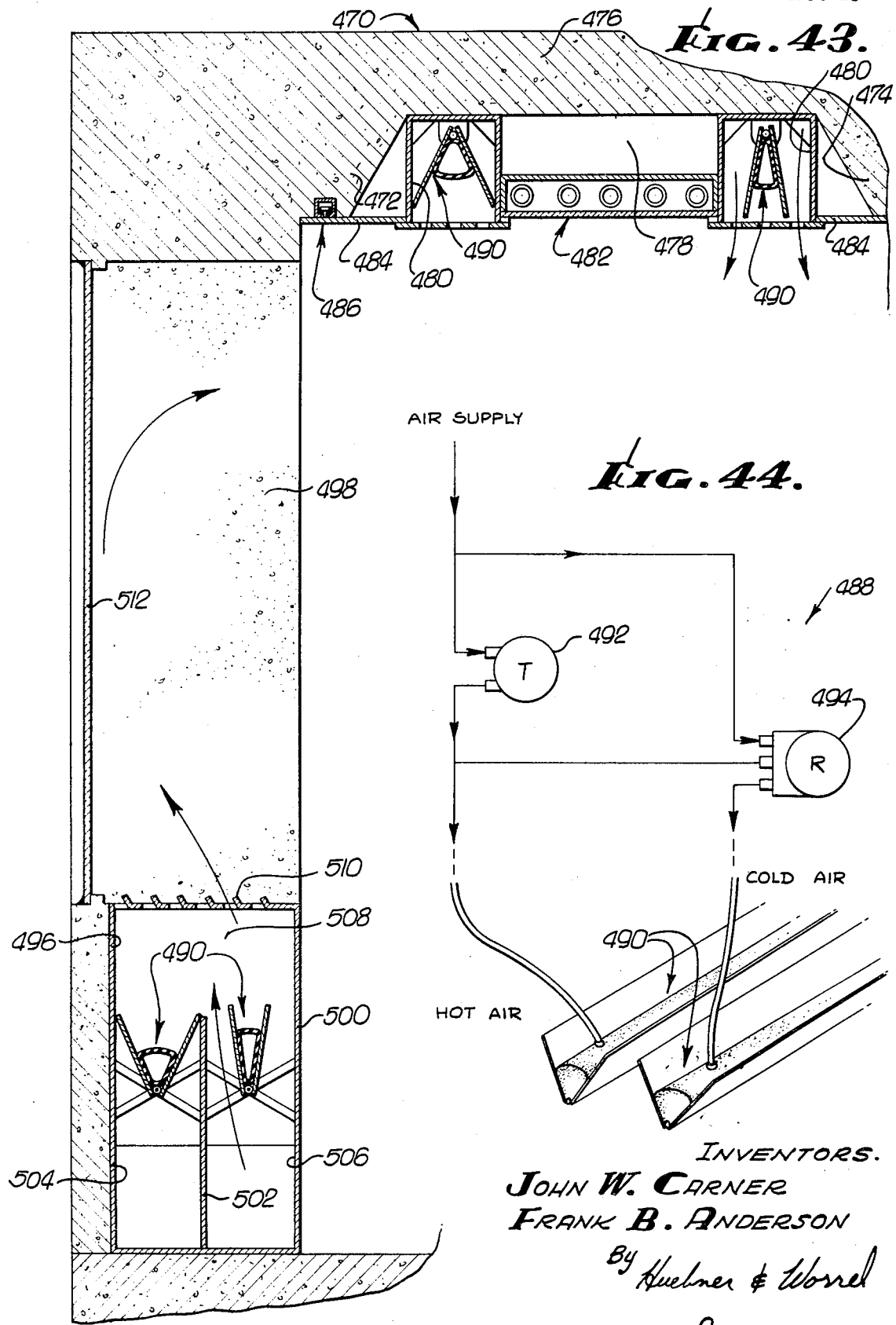

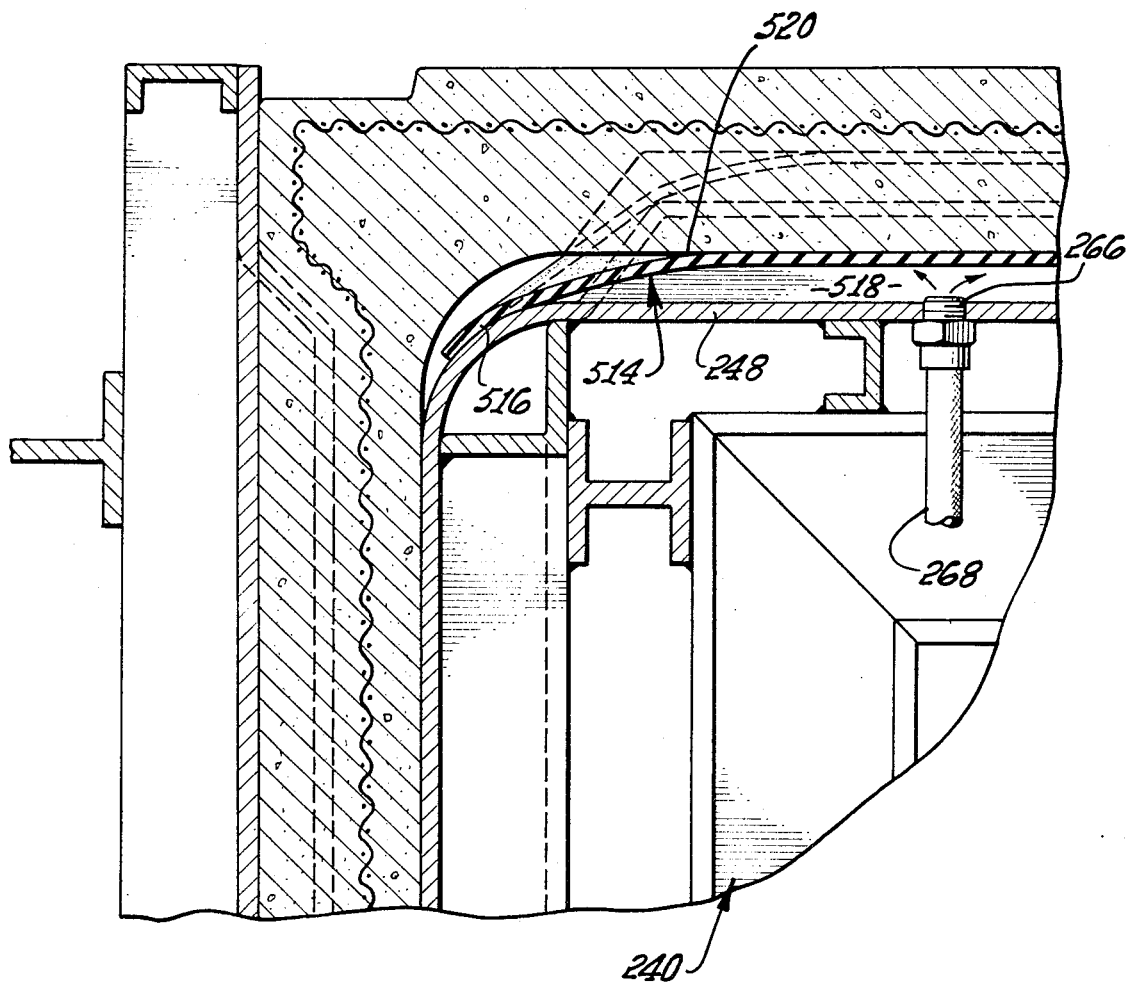

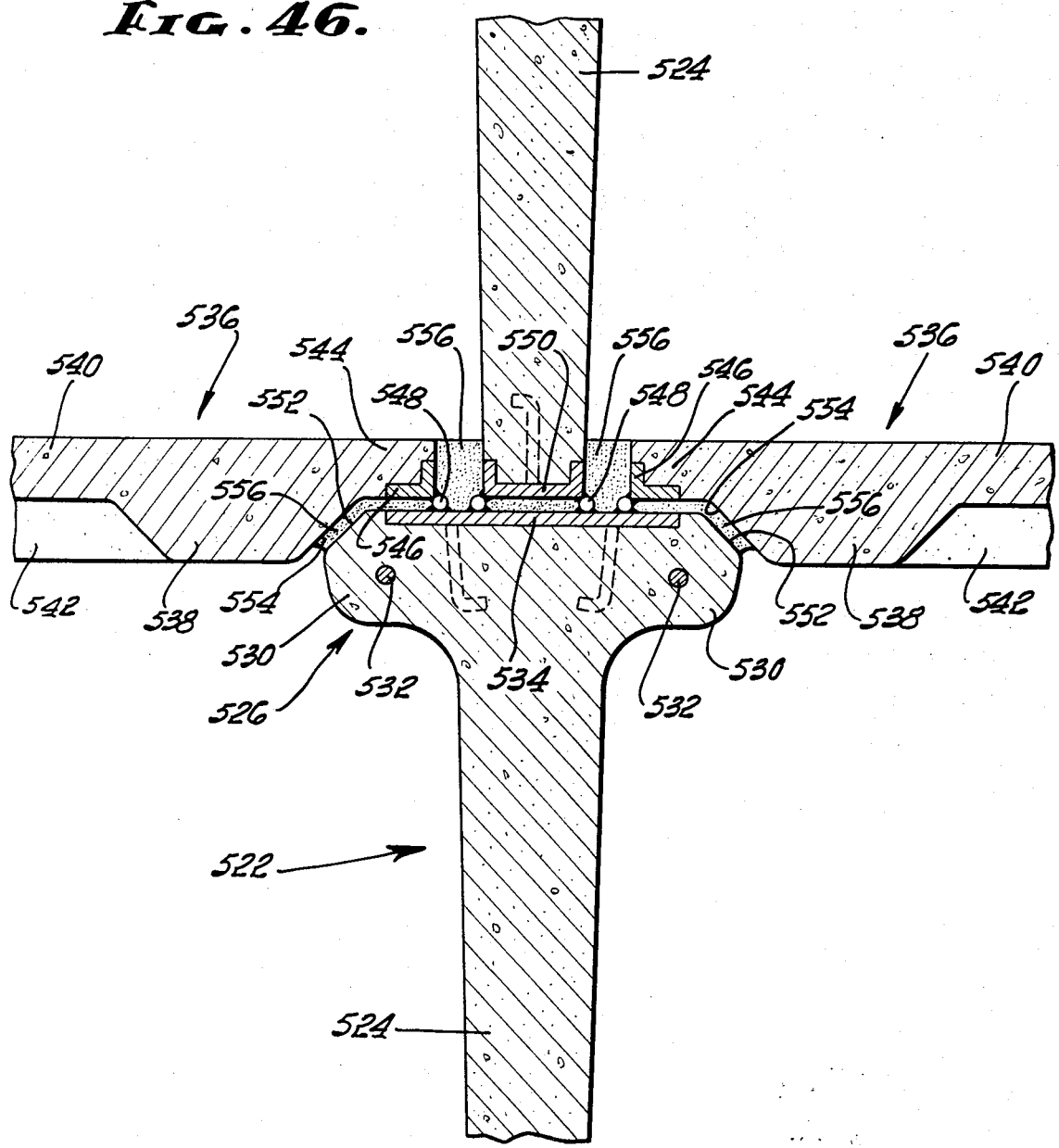

United States Patent Office 3,714,304
Patented Jan. 30, 1973

3,714,304
BUILDING CONSTRUCTION
John W. Carner, Rolling Hills, and Frank B. Anderson, El Segundo, Calif., assignors to Frank B. Anderson, El Segundo, and Earl E. Shaw, San Pedro, Calif.
Filed Dec. 29, 1969, Ser. No. 888,762
Int. Cl. B28b 7/12, 7/22, 7/30
U.S. Cl. 264—94
30 Claims

ABSTRACT OF THE DISCLOSURE

A modular building construction system of three interrelated phases: (1) a new method for precasting monolithic concrete building modules utilizing a plurality of essentially solid or uninterrupted internal mold members which shift vertically relative to the cast structure for release; (2) a new resulting precast monolithic building module provided by said method of high strength-to-weight ratio comprising ceiling structure with integral depending wall structure that is open at the bottom, the wall structure including both external and internal walls arranged in any desired horizontal-sectional wall plan not restricted by the casting method; and (3) a multi-story building comprising a plurality of these precast modules provided by said method in stacked relationship with the ceiling structure of each but the uppermost module serving as the floor of the next module above, the monolithic relationship between the ceiling-floor structures and both external and internal walls providing a total cellular construction wherein substantially all parts of the building contribute to its structural strength.

BACKGROUND OF THE INVENTION

Conventional building construction wherein all or most of the fabrication occurs at the construction site, while producing a satisfactory end product, involves very high labor costs, which have for many years been steadily rising. The only satisfactory alternative to such conventional construction is the technique of prefabrication which allows at least portions of a structure to be produced at a central plant and then shipped to the construction site where they are assembled into the building structure. By suitable application of prefabrication techniques, up to fifty percent or more of the total labor costs can be saved. However, heretofore there have been a number of serious drawbacks in the methods and apparatus employed in building prefabrication, as well as in the prefabricated building parts and in the total building structures constructed therefrom.

It is well established that the most satisfactory building material, from the standpoints of cost, structural strength, and durability, is reinforced concrete. For many years some of the relatively simple types of building structural members, such as beams, floor slabs, wall slabs, and the like, have been prefabricated at a central plant and then shipped to the construction site. However, such structural members still had to be assembled at the site in connection with generally conventional building frames, and effected only relatively small savings in labor costs. Use of such prefabricated structural members tended to add weight to the over-all structure without additional strength, and sometimes with a sacrifice in over-all strength, left the structure vulnerable to chance mistakes of labor in assembling and connecting the prefabricated members, which was usually done by means of weld joints, and introduced uncertainties in structural strength in the form of "diffused moments."

In order to achieve a maximum amount of factory prefabrication, and hence the greatest savings in labor costs, there have been numerous attempts in recent years to produce satisfactory building structures which are primarily assemblies of precast reinforced concrete modules each of which includes a floor, walls, and a ceiling structure, such modules each being adapted to encompass one or more rooms, and the modules being arranged and attached in side-by-side relationship for houses, and in stacked relationship for multi-story buildings, such as apartment houses or the like. However, there have been a number of serious difficulties encountered in manufacturing such precast concrete building modules, as well as deficiencies in the modules themselves, and in building structures composed of a plurality of such modules, which have, prior to the present invention, prevented such modular building structures from becoming even competitive with conventional building structures.

One major problem in the precasting of reinforced concrete building modules having either a floor or a ceiling or both combined with wall structures is that conventional concrete shrinks while it is setting up, and with structures as large as building modules the shrinkage of floors and ceilings draws the wall structures inwardly. Thus, inside mold forms employed to produce room cavities would, unless removed prior to substantial shrinkage, provide an obstruction to such shrinkage which would cause the setting up module to break apart as the shrinkage occurred. In order to prevent such breakage from shrinking of the module about the inside mold forms, it has, prior to the present invention, been conventional practice in the precasting of reinforced concrete building modules to employ break-apart inside mold members which during the setting up of the concrete can be broken away inwardly before substantial shrinkage occurs. A typical example of such a break-apart inside mold form is shown in U.S. Pat. No. 2,593,465, to LeTourneau, wherein the inside mold breaks apart at each of its four corners and at the center of each of its four panels, as well as breaking apart from the top of the mold around the entire periphery thereof.

Such break-apart internal mold forms are required to have so many junctions between the various panels thereof that it is almost impossible to totally seal the joints, and as a consequence air pressure can not be maintained between such forms and the cast module for separation and ceiling support, thus precluding early stripping from the mold before substantial curing; as another consequence there is generally a substantial amount of leakage of water from the concrete, which causes rock pockets and the like to develop, requiring substantial additional time and expense of labor for finishing of these bad spots in the concrete. For effective and efficient precasting of concrete building modules, complete sealing of the mold members is a critical factor, and this is virtually impossible with break-apart inside mold members.

During the casting of concrete building modules the concrete must be consolidated by vibration, and this results in the application of very high lateral pressures against the mold forms in the region of the walls. These pressures are so high that the panels of the break-apart inside mold members give and become misaligned, resulting in cracks which produce substantial irregularities on the inside wall surfaces, which presents a substantial inside finishing problem, and consequent added labor expense.

Another serious disadvantage of break-apart inside mold members is that they are too complex to be economically automated, and the consequent manual labor involved in setting up and taking down such mold members causes a substantial slowdown in the operation and adds further labor expense.

The various prior art attempts to produce precast concrete building modules have resulted in a severe limitation in the wall plans (in horizontal section) that are available. In general, prior art methods of precasting concrete building modules have not been capable of producing a wall plan that is conventionally acceptable in apartment houses or in homes, and it has been necessary to complete the building structures made up of such prior art modules by adding a variety of walls and partitions made of wood or plaster or block. As an example, most prior art attempts to precast building modules have involved break-apart internal mold members which are adapted to move horizontally out of the cast structure, resulting in the requirement that all of the internal walls of the cast structure be oriented in the same direction, i.e., be parallel. This requirement with prior art precast concrete modules that various internal walls and partitions be added to complete the structures results in further undesirable labor costs and time consumption at the building site, and also results in an over-all building structure which has many walls, partitions and the like that do not in any way contribute to the structural strength of the building, but instead reduce the strength-to-weight ratio by adding considerable dead weight to the building.

A further problem in connection with prior art precast concrete building modules is that, in general, they are considerably heavier than necessary, thereby increasing the cost of transport and in the case of multi-story structures, placing considerable added weight to the foundation and thereby requiring a stronger and more expensive foundation, and also placing an undesirably large amount of weight on lower modules in the stack. In this connection, the usual practice is to provide precast modules which each have both a floor and a ceiling structure, so that when the modules are stacked in a multi-story unit, there is unnecessary and generally undesirable duplication of horizontal structure in the ceiling of each unit and the floor of the next unit above. For the small amount of additional structural strength thereby gained, there is a disproportionally large amount of excess weight added.

Another problem which is presented by prior art break-apart type internal mold members is that because of the complexity thereof, there was no practical way of accurately centering the inner mold structure relative to the outer mold structure. As a result, there was a likelihood of uneven wall thicknesses throughout the precast structures which could not be predetermined, and which were difficult to detect. This resulted in a diminishing of overall structural strength, and in order to assure adequate strength required that in general the walls be made somewhat thicker than would be the case if they were even and of predetermined thickness.

This problem of unevenness or lack of the ability to hold close tolerances is also a problem in conventional building construction. In general, the tolerances cannot be held sufficiently close in either conventional building construction or in prior art precast concrete building modules to permit the separate prefabrication of large sub-assemblies such as sub-assemblies of plumbing, kitchen utilities, cabinets, walk-ins, and the like, and then installation of these large sub-assemblies as a unit. Instead, such sub-assemblies have been required to be fabricated at the building site in order to accommodate the variations in dimensions inherent in conventional building construction and in prior art precast building modules. Poor tolerance control in prior art modular construction made stacking of the modules difficult, with considerable adjustment by shimming required.

A still further problem in connection with the prior art precasting of reinforced concrete building modules was that it was very difficult and time-consuming to properly place all of the necessary steel reinforcing bar (hereinafter usually referred to as rebar, a term widely used in the trade), so as to assure adequate and generally uniform strength throughout the modules.

Most of the foregoing and other problems encountered in prior art attempts to provide a satisfactory precast reinforced concrete building module have involved the use of conventional concrete of the type which shrinks slightly during the setting up thereof. This is for the reason that such conventional concrete is the most economical and available type of concrete, and is also the most predictable and generally the most easy to use. Nevertheless, it is recognized that there is a recent development in concrete in the form of a type of concrete which has a slight expansion rather than a shrink which occurs during the setting up period. Such expanding concrete, like the contracting type, applies very high stresses both to mold members and to the cast, uncured structure, and as with the shrink type of concrete, there has, prior to the present invention, been no satisfactory method or apparatus for precasting reinforced concrete building modules of this expanding type of concrete.

In general, it will be seen from the foregoing that while the use of precast reinforced concrete building modules which can be fabricated at a central plant and then transported to the building site and assembled at the site, is capable of providing a substantial reduction in labor costs, nevertheless, prior art methods and apparatus for casting such modules have involved so many problems and deficiencies in the resulting structures that modular building construction has not as yet come into widespread use.

SUMMARY OF THE INVENTION

In view of these and other problems in the art, it is a general object of the present invention to provide a novel method of precasting reinforced concrete building modules, and novel apparatus employed with the method, which permit substantially fully automated, high-speed production of the modules, with the resulting cast modules having close-tolerance dimensions and superior surface quality and regularity throughout.

It is another general object of the present invention to provide a novel precast monolithic reinforced concrete building module of high strength-to-weight ratio and having internal and external walls arranged in any desired horizontal-sectional wall plan which is not in any way restricted by the casting method or apparatus.

A still further general object of the invention is to provide a multi-story building, as for example, a high rise apartment building, comprising a plurality of the novel precast modules of the invention arranged in stacked relationship with the ceiling structure of each but the uppermost module serving as the floor of the next module above, and wherein the inclusion of substantially all of the internal wall structures as integral parts of the monolithic building modules effects a total cellular construction wherein substantially all parts of the building contribute to its structural strength.

Another and more detailed object of the invention is to provide novel method and apparatus for precasting monolithic concrete building modules utilizing a plurality of essentially solid or uninterrupted internal mold members which define the respective room cavities in the cast structure, and which, by virtue of their solid or uninterrupted nature permit rugged construction capable of withstanding the extremely high pressures of the vibrated concrete without developing cracks or misaligned portions, and thereby permits close tolerance dimensions to be held; and which effects a reliable and substantially complete seal permitting air pressure to be employed for ceiling support and to separate the casting from the mold in early stripping, and to seal against loss of water from the poured concrete, thereby eliminating the usual rock pockets and loose material.

Another object is to provide novel methods and apparatus associated with the aforesaid solid inside mold members for accommodating the adjustment in the size of the concrete as it sets up, this adjustment being a shrinking in the case of conventional concrete, while at the same time maintaining the integrity of the solid, uninterrupted mold structures. According to one such method and apparatus, the solid molds taper inwardly from bottom to top on all wall-forming surfaces thereof, and the inside mold members are shifted a short distance downwardly relative to the poured structure, as for example, approximately one inch, after the concrete has set up sufficiently to retain its shape but not before any material shrinkage has occurred. The taper on the inside mold forms, and the complementary taper applied thereby to the walls, permit an accurately controlled spacing to be developed between the mold forms and the walls to allow for shrinkage, while at the same time providing the desired support to assure that the concrete will retain its shape. This small amount of vertical shifting of the inside mold members relative to the poured structure leaves the top surfaces of the mold spaced downwardly from the ceiling structures, and in the case of closed ceiling module castings the ceiling structures can be supported either by compensating fluid pressure, such as air pressure, introduced between the mold forms and the ceiling structure, or by casting self-sustaining rebar truss reinforced beams in the ceiling structure which are sufficiently stable to support the ceiling without fluid pressure, or by a combination of these means.

A second method and associated apparatus according to the invention for accommodating the shrink of the concrete in connection with solid, uninterrupted inside mold members involves the use of rigid steel mold panels surfaced by inflatable honeycomb elastomer sheet material which can be inflated to the required pressure during pouring and initial forming of the concrete, and can have the pressure therein released sufficiently to accommodate shrinkage of the concrete while at the same time presenting adequate support to maintain the shape of the hardening structure.

A third method and associated apparatus for accommodating the shrink according to the invention, while at the same time utilizing solid inside mold members, involves the use of a fiber glass reinforced plastic sheath over a tapered rigid steel mold member, the inside steel mold member providing the necessary structural strength during pouring and vibrating of the concrete and during the initial interval in which setting up commences, but being withdrawn from inside the fiber glass reinforced plastic sheath prior to substantial shrinkage of the concrete. The fiber glass sheath then has sufficient stability and strength to retain the shape of the concrete until it has hardened to the desired extent, after which the sheath can be blown free of the module and reused, the sheath nevertheless having sufficient give therein to accommodate the shrinkage of the concrete without resulting in damage to the module.

Another object of the invention is to provide a novel method and apparatus of the character described for precasting concrete building modules wherein the outer and inner mold members are constructed of a minimum number of parts that are all rugged and durable in construction, and wherein these outer and inner mold members are closely structurally correlated so that the spacing therebetween, and consequently the walls of the precast structures that are molded therebetween, are uniform and predictable in their dimensions within close tolerances.

Another object of the invention is to provide a novel method and apparatus of the character described for precasting concrete building modules wherein the modules are cast with a ceiling structure and depending wall structures, but are open at the bottom, each cast module being supported relative to both the inside and outside mold members for vertical separating movement therebetween, whereby after a module has been cast, separation of the module from the mold can be accomplished either by lowering the mold away from the module or raising the module up out of the mold. The outside mold panels are additionally horizontally shiftable so that they can be employed in the casting of various shapes, textures, and apertures in the outer walls, and then shifted laterally away from the walls to provide clearance for the relative vertical separating movement between the cast structure and outer mold panels. Thus, the outer mold panels can have window mold frame members projecting inwardly therefrom, can be configured to provide relatively thin outer walls with pilasters to provide the required vertical column strength, can have rubberized texture sheets affixed thereto for duplication of any desired external finish such as a rough wood finish, brick finish, or the like, and can have plug members projecting inwardly therefrom to define plumbing holes and the like through the outer walls. The open bottom construction of the cast modules and vertical release movement permit door jambs to be integrally cast in both inner and outer walls, so that the mounting thereof has the maximum possible strength. By making the modules completely open at the bottom, and employing vertical separating movement between module and mold, there is no limitation whatsoever to the horizontal-sectional wall plan for both the outer and the inner walls of the cast modules, and the various walls may have any desired angular relation to each other. In fact, the only limitation to the number and arrangement of walls and rooms in a precast module made in accordance with the present invention is that the module not be made too large to transport.

Another object of the invention is to provide novel support structure for a precast concrete building module of the character described which includes a bottom frame having the same plan as the wall plan of the module, providing the support means over which the walls of the module can be poured, while still permitting relative vertical movement between the module and the mold members for preliminary vertical movement to allow for concrete shrinkage, and for the final vertical separation of the module from the mold. The support structure additionally includes an upper frame also generally having the wall plan of the module, which serves in an initial capacity as a support from which welded sheets of high tensile steel wire mesh reinforcement are suspended into the wall cavities of the mold, and which after pouring of the concrete and preliminary setting up thereof serves as a structure against which the walls may be compressed upwardly by hydraulic actuators operating through rods that extend vertically downwardly through the walls and terminate in channel members at the bottoms of the walls, so as to provide temporary compressive stressing of the walls to allow early safe separation of the module from the mold and handling of the module in a subsequent assembly line procedure while the concrete of the module is still curing, thus expediting the over-all efficiency of the central production plant operation.

A further object of the invention is to provide a method and apparatus of the character described which is so uniform and reliable in operation that a series of modules that are cast in the same mold complex will have uniform room cavity and wall dimensions within a very close tolerance, which fact, coupled with the open bottom construction of the modules, permits prefabricated subassemblies of any size to be installed in the modules at the central production plant. Such installation is accomplished by attachment of such prefabricated sub-assemblies to wall structures, since there is no floor prior to installation at the site, and includes but is not limited to such sub-assemblies as cabinets, kitchen units including stove, oven, refrigerator, sink, and the like, walk-in closets, plumbing pipe sub-assemblies, plumbing fixtures such as bathtub, shower, basin and toilet, and the like.

A further object of the invention is to provide novel building module casting method and apparatus which, by means of the vertical shiftability between the inner mold members and the cast structure, permits air conditioning passages to be cast directly in the walls thereof, and additionally, permits the casting of recesses in the ceilings thereof which are suitable for receiving overhead lighting and air conditioning equipment without requiring the great expense and space loss involved in conventional dropped ceiling accommodation of overhead lighting and air conditioning.

A still further object of the invention is to provide a novel precast reinforced concrete building module embodying ceiling and depending wall structures, but being open at the bottom, the walls tapering from a relatively thick cross-section proximate the ceiling down to a relatively thin cross-section at their bottom, free edges, this taper providing miximum transverse or sheer strength of the wall structures proximate the roots of the walls adjacent the ceiling structure, while at the same time minimizing the weight of the walls, so that a building constructed of modules according to the present invention will have a particularly high strength-to-weight ratio. The method of the invention not only particularly lends itself to the production of such tapered walls, but also to the inclusion of cornice beams along the upper edges of the walls and forming portions of the ceiling structures, these cornice beams further adding to the strength of the modules. The high strength-to-weight ratio of the modules is important not only in the final building structure composed of the modules, but also by way of pick-up strength during early handling of modules after they are cast, which is the time that the modules are most vulnerable to damage.

An additional object of the invention is to provide a multi-story building, as for example, a high-rise apartment building, composed of a plurality of modules made in accordance with the present invention in stacked relationship, with the ceiling structure of each but the uppermost module serving as the floor of the next module above, wherein the monolithic relationship between the ceiling-floor structures and both external and internal walls coupled with the generally arbitrary angular positioning of the internal walls, provides a total cellular construction wherein every module and every room therein constitutes a cell, and all of the external and internal walls contribute to the overall shear strength and bearing strength of the structure. This results in a modular building structure of substantially greater strength than prior art building structures made of precast parts, and it also eliminates the likelihood of weaknesses occurring in the structure as a result of chance mistakes made by labor. This total cellular construction causes substantially all walls, floors, and ceilings of the building to react to stresses such as earthquakes, winds and the like, instead of just pieces of the building reacting as with prior art buildings of precast construction.

Another object of the invention is to provide a modular building structure of the character described which includes a central seismic core tower with precast concrete modules of the character described peripherally arranged and vertically stacked about the seismic core, each layer of the modules immediately adjacent to the core being secured to the core by a substantially continuous annular web or diaphragm of reinforced concrete proximate the floor level of that layer of modules, and all of the adjacent modules in the entire building, both vertically adjacent and laterally adjacent, being welded together by weld joints between weld plates that are cast in place in the modules, thereby providing a total building structure of great strength which can be built up to many stories while still being capable of safely withstanding unusual stresses, such as earthquakes, windstorms, and the like. The central core tower not only serves as a means for strengthening the entire building structure, but also serves as a convenient means for housing services required for all floor levels, such as elevators, stairways, laundry chutes, and the like. According to the present invention, the core may also be employed as base structure for a crane employed for hoisting the building modules into place, thereby permitting the use of a much smaller and more economical crane structure for assembling buildings according to the present invention than is conventionally required.

Further objects and advantages of the present invention will appear during the course of the following part of the specification, wherein the details of construction, mode of operation, and novel method steps of presently preferred embodiments of the invention are described with reference to the accompanying drawings, in which:

BRIEF DESCRIPTION OF THE DRAWINGS

FIG. 1 is a perspective view illustrating a high rise building structure according to the present invention in assembly process, showing in particular a seismic core and crane arrangement employed in the assembly, and individual building modules according to the invention being lifted and stacked into place;

FIG. 2 is a fragmentary horizontal section taken through an apartment and adjoining part of the seismic core in the completed building which is under construction in FIG. 1, the apartment including two different modules that are joined together to provide the complete apartment, an inner module of the type illustrated in FIG. 1 joined directly to the seismic core, and an outer module attached to the outer edge structure of the inner module;

FIG. 2a is an enlarged, fragmentary, horizontal section in the region designated 2a in FIG. 2;

FIG. 3 is an enlarged, fragmentary, vertical section taken on the line 3—3 in FIG. 2;

FIG. 4 is an enlarged, fragmentary, vertical section with a portion broken away, taken on the line 4—4 in FIG. 2;

FIG. 5 is an enlarged, fragmentary, vertical section taken on the line 5—5 in FIG. 2;

FIG. 6 is an enlarged, fragmentary, vertical section taken on the line 6—6 in FIG. 2;

FIG. 7 is an enlarged, fragmentary, vertical section taken on the line 7—7 in FIG. 2;

FIG. 8 is a diagrammatic view illustrating an assembly line production plant for the precasting and finishing of modules according to the invention, and installation of various sub-assemblies therein;

FIG. 9 is a vertical section, with portions shown in elevation, illustrating one form of molding apparatus according to the invention, with the mold members in closed position and a module according to the invention formed therein;

FIG. 10 is an enlarged, fragmentary, vertical section taken in the region designated 10 in FIG. 9, illustrating details of construction of the inner and outer mold members, and also internal details of construction of the corner region between wall and ceiling of the cast module;

FIG. 11 is an enlarged, fragmentary, vertical section taken in the region designated 11 in FIG. 9 illustrating further details of construction of the mold members and of the cast module;

FIG. 13 is a fragmentary horizontal section taken on the line 13—13 in FIG. 10;

FIG. 14 is a fragmentary vertical section taken on the line 14—14 in FIG. 10;

FIG. 15 is an enlarged, fragmentary, vertical section taken in the region designated 15 in FIG. 9;

FIG. 17 is a vertical section generaly similar to FIG. 9, but illustrating the manner in which the cast module is supported from an overhead crane for movement to another station, and illustrating the mold members withdrawn downwardly completely out of engagement with the cast structure;

FIG. 18 is a perspective view, with a portion broken away, illustrating the internal mold members and the cast module of FIGS. 9 to 17 in vertically spaced or exploded relationship;

FIG. 19 is a fragmentary vertical section similar to FIG. 12, but illustrating the casting of the outer module shown in FIG. 2, FIGS. 9 through 18 illustrating the casting of the inner module shown in FIG. 2;

FIG. 20 is a vertical section taken on the line 20—20 in FIG. 19, showing some of the molding apparatus in section, but primarily illustrating the outer wall of the module in elevation so as to show window forming mold structure and surface texturing that can be applied to outer wall surfaces;

FIG. 21 is an enlarged, fragmentary, horizontal section, with a portion broken away, taken on the line 21—21 in FIG. 20, illustrating further details of the molding apparatus and of the outer wall and corner structure of the cast module;

FIG. 22 is an enlarged, fragmentary, vertical section taken on the line 22—22 in FIG. 20, illustrating the apparatus and method for casting window apertures in the outer wall;

FIG. 23 is an enlarged, fragmentary, vertical section similar to FIG. 22, but illustrating the completed window aperture region of the wall after the associated molding apparatus has been removed and a window frame and window have been installed;

FIG. 24 is an enlarged, fragmentary, vertical section taken on the line 24—24 in FIG. 18, illustrating the apparatus and method for molding a door jamb integrally with the wall structure;

FIG. 25 is an enlarged, fragmentary, vertical section taken in the region designated 25 in FIG. 15, particularly illustrating the apparatus for sealing the lower edges of the walls in an air-tight seal permitting air cushion support of the poured ceiling structure during initial lowering of the mold, and to seal against leakage of moisture from the concrete during the casting process;

FIG. 26 is an enlarged, fragmentary, vertical section, with portions in elevation, taken on the line 26—26 in FIG. 12, illustrating plug means for providing an access opening through an external or internal wall of the cast module;

FIG. 29 is a vertical section, with portions in elevation, similar to FIG. 9, but illustrating a third form of molding apparatus and method employing inflatable elastomer sheet means over the side panels of the solid internal mold member;

FIG. 30 is an enlarged, fragmentary, vertical section taken in the region designated 30 in FIG. 29, illustrating further details of the molding apparatus shown in FIG. 29;

FIG. 31 is a fragmentary horizontal section taken on the line 31—31 in FIG. 30;

FIG. 32 is a further enlarged, fragmentary, vertical section taken in the region designated 32 in FIG. 30, more clearly illustrating details of the inflatable elastomer sheet;

FIG. 33 is a vertical section, with portions in elevation, similar to FIGS. 9 and 29, but illustrating apparatus and method of casting a module having a slant roof;

FIG. 34 is an enlarged, fragmentary, vertical section taken in the region designated 34 in FIG. 33, illustrating vertically shiftable outer mold means operatively positioned for molding a slant eave forming an extension of the slant roof in FIG. 33;

FIG. 35 is a view similar to FIG. 34, but illustrating the eave molding apparatus shifted downwardly to a retracted position;

FIGS. 39 and 40 are perspective views illustrating plumbing sub-assemblies suitable for an apartment module such as that best shown in FIG. 2, the sub-assembly of FIG. 39 being for outlet drainage and that of FIG. 40 being for incoming hot and cold water.

FIG. 41 is a perspective view looking into the kitchen area of the apartment module shown in FIG. 2, illustrating the manner in which large kitchen fixture sub-assemblies can be installed into the module from the open bottom thereof and secured to the walls thereof;

FIG. 42 is an enlarged, fragmentary, vertical section taken on the line 42—42 in FIG. 41, illustrating bracket means for the wall mounting of sub-assemblies;

FIG. 43 is a schematic vertical section of building wall and ceiling structure according to the present invention, illustrating the manner in which overhead air conditioning and lighting can be applied to structures according to the invention, and also illustrating the manner in which air conditioning can be applied to wall and window areas;

FIG. 44 is a diagrammatic view of suitable air conditioning apparatus to be employed with the invention;

FIG. 45 is an enlarged, fragmentary, vertical section similar to FIG. 16, but illustrating the addition of a resilient, elastomeric diaphragm covering the top of the inside mold and peripherally bonded thereto for cleaner stripping and to contain the air cushion for supporting the ceiling during intial lowering of the mold; and FIG. 46 is an enlarged, fragmentary, vertical section illustrating alternative module construction wherein the ceiling structure includes cornice beams along the upper edges of the walls and ceiling slabs welded thereto.

DETAILED DESCRIPTION

Figure 12:
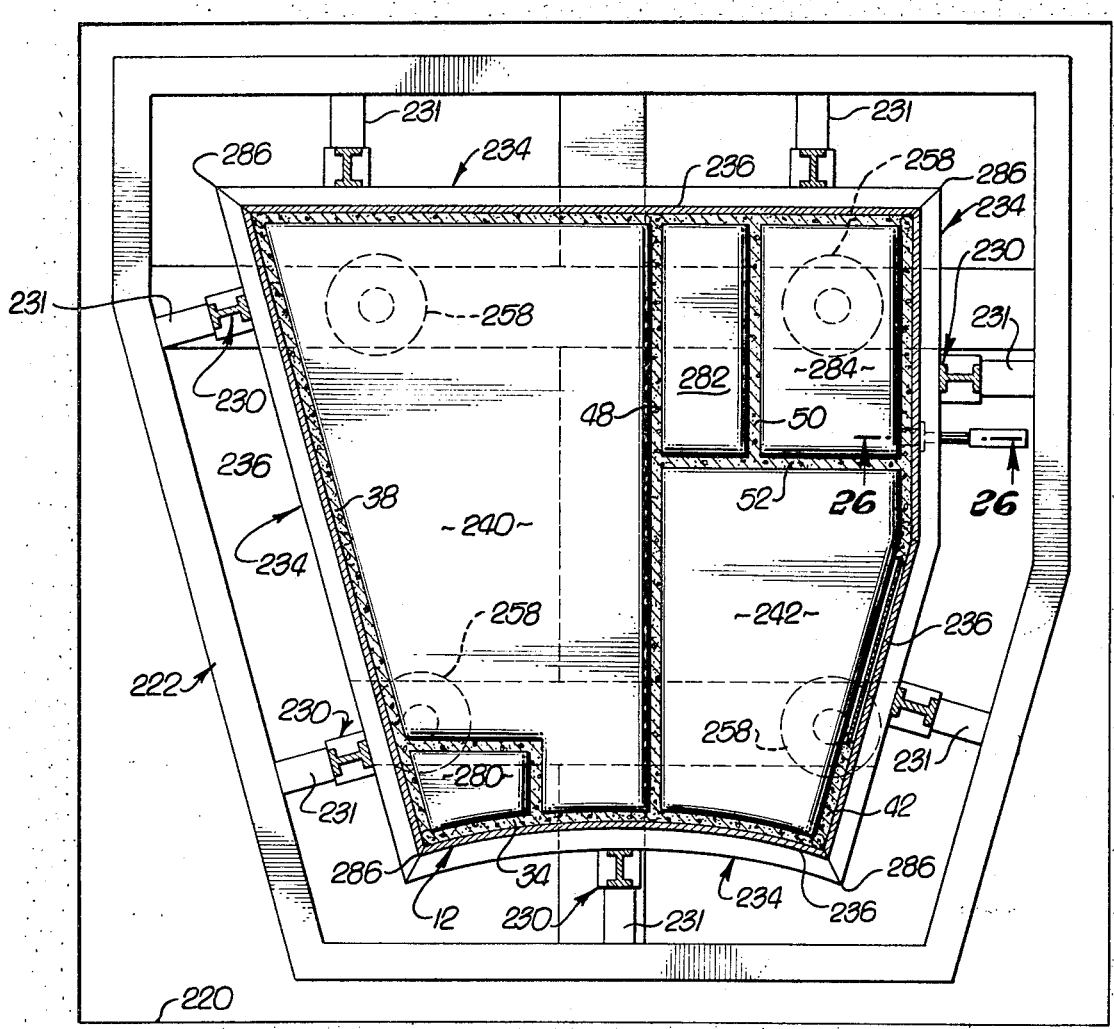
FIG. 12 is a horizontal section taken on the line 12—12 in FIG. 9, illustrating the over-all casting pit area and internal mold members in plan view, and showing the cast module in section.

Referring to the drawings, and at first particularly to FIG. 1 thereof, this figure illustrates a high rise apartment building under construction which employs a circular array of stacked precast building modules according to the invention. Preferably, but not necessarily, a high rise building of this general character is built around a seismic core tower such as the tower 10, which is a reinforced concrete monolithic structure that is preferably slip-formed at the building site. The core tower 10 illustrated in FIG. 1 is cylindrical, but it is to be understood that it may have any other desired shape in horizontal section, as for example, rectangular, oblong, S-shaped, or other configuration.

Shown being lifted into place about the core tower 10 are a plurality of modules 12 made in accordance with the invention, the modules 12 being disposed in a circular array about the core 10, and being vertically stacked one above the other.

The core tower 10 illustrated in FIG. 1 includes concentric outer and inner core structures 14 and 16, respectively, which may be arranged as desired to provide services that are common to all floor levels, as for example, elevators, staircases, laundry chutes, and the like. Thus, in the completed building structure, the core tower 10 provides both structural stability to the building and a region for common services to the various floors. Additionally, the applicants have found the seismic core tower to be ideally suited as a base structure for the crane which is necessary for hoisting the precast modules into place. A large part of the weight and expense of a conventional crane is tied up in the base structure thereof, and such conventional base structure can be eliminated by adapting the upper rim of the core tower 10 to support a crane such as the crane 18 shown in FIG. 1. The crane 18 may thus be a simplified crane structure, including a body or chassis 20 extending diametrically across the top of the core tower 10 and arranged to rotate about a central spindle 22 on a track 24 that is mounted on the upper rim of the outer core structure 14. Mounted on the body or chassis 20 of the crane 18 is a winch box 26 of conventional construction which controls lifting cable 28 that is suspended over a conventional lifting arm 30. Axially slidably supported on the body or chassis 20 at the opposite end portion thereof from the lifting arm 30 is a counterweight 31 which serves to balance the weight of the modules 12 that are lifted by the crane 18.

It will be understood that the modules 12 will be stacked along substantially the entire height of the core tower 10 and around the entire periphery thereof, during the assembly of the building at the construction site, all of the modules 12 being connected to the core tower 10 proximate the floor-ceiling lever thereof, preferably in the manner illustrated in FIG. 2 of the drawings. Additionally, an outer ring of precast modules 32 may be concentrically disposed around the outside of the inner modules 12, as best shown in FIG. 2, a pair of the modules 12 and 32 together making up a single apartment dwelling.

The first or lowermost layer of the modules 12 and 32 is disposed upon suitable floor slab means (not shown), and then the ceiling structures of the modules in the first layer constitute the floors of the corresponding modules in the second layer, and this relationship continues on up through the building structure, with ceiling structure of each module serving as the floor of the next module above, up to the top of the completed building.

Not only are all of the inner modules 12 securely joined to the seismic core tower 10, as illustrated in FIG. 2, but also each of the inner modules 12 is securely connected, as by welding, to the similar modules 12 on both sides thereof, and to the modules 12 immediately above and below it in the stack. Similarly, each of the outer modules 32 is securely connected to the corresponding inner module 12, to the adjacent modules 32 on opposite sides thereof, and to the modules 32 immediately above and below it in the stack. These various connective relationships are illustrated in some detail in FIGS. 2 to 7, and, in cooperation with the monolithic construction of the inner and outer walls and ceilings of each module, result in an over-all building structure which may be considered to be of total cellular construction of much higher strength-to-weight ratio than prior art precast building structures.

FIG. 2 illustrates representative floor plans for apartment modules 12 and 32, which are joined together to form an apartument dwelling unit. Referring at first to the inner module 12, this includes an arcuate inner wall 34, arranged concentrically with the seismic core 10, a straight outer wall 36, a side wall 38 extending between corresponding ends of the inner and outer walls 34 and 36, respectively, and directed radially relative to the seismic core 10, and a side wall 40 on the other side of module 12 which includes an inner radially directed section 42 and an outer section 44 extending at an obtuse angle relative to the inner section 42.

The module 12 also includes integral internal partition walls 46, 48, 50 and 52, all of which depend integrally from the ceiling structure of the module and are joined to other wall structures in a unitary cellular construction.

The arrangement of the aforesaid outer and inner walls in module 12 is such as to define a living room area 54, a closet area 56, a kitchen area 58, a bathroom area 60, and a hallway area 62. As viewed in FIG. 2, the reference numbers for these areas are applied to the respective floors of the areas, and these floor areas will be designated by these respective reference numbers in the following part of this description which refers to FIGS. 2a to 7.

Still referring to the inner module 12 in FIG. 2, a series of doorways and connecting passages between rooms is designated by the reference numbers 64, 66, 68, 70, 72, 74, and 76. Each of these openings is defined either within a wall, or between a pair of walls, and includes overhead wall structure above the doorway or passage which integrally depends from the ceiling structure and also integrally joins with the wall structures on opposite sides of the doorway or passage, so as to further enhance the cellular construction of the module. Doorway 64 is between the living room area 54 and the closet area 56; passage 66 lies in the partition wall 48, and provides communication between the living room area 54 and the kitchen area 58; doorway 68 lies in the outer wall 36, and is adapted to have sliding glass door panels therein providing access to an outside patio, hereinafter described; doorway 70 is in partition wall 50, and provides communication between the bathroom area 60 and the hallway 62; doorway 72 lies between walls 48 and 50, as well as the inner end edge of wall 52, and provides communication between the kitchen area 58 and the hallway 62; passage 74 lies in the outer wall 36, and is disposed between the partition walls 48 and 50, and defines the outer end of the hallway in module 12 where it communicates with a corresponding hallway in the module 32; and finally, the doorway 76 is disposed in the arcuate inner wall 34, and is the entrance doorway to the apartment dwelling defined by modules 12 and 32.

The angular section 44 of side wall 40 leaves a triangular plumbing chaseway 78 defined between angular section 44, the exposed part of the inner wall of outer module 32, and the side wall 38 of the next adjoining module 12. By this arrangement, the plumbing chaseway 78 is disposed immediately behind the wall from the kitchen sink 80 and the various bathroom fixtures utilizing plumbing, including the toilet 82, the wash basin 84, and bath tub 86.

Connection of the inner module 12 to the outer cylindrical structure 14 of core tower 10 is provided by means of a horizontal, arcuate connecting web 88, which is preferably a reinforced concrete slab that is cast in place, as will hereinafter be described in further detail in connection with FIG. 6 of the drawings. The connecting web 88 provides an annular hallway leading from the various facilities of the core tower 10 to the entrance doorway 76 of each apartment unit. A passage 90 in the outer core structure 14 is shown by way of illustration to give access from the hallway defined by the connecting web 88 and the inside of the core tower 10.

Still referring to FIG. 2, the outer module 32 includes a straight inner wall 92 disposed adjacent and parallel to the outer wall of inner module 12, an outer wall 94 arranged parallel to the inner wall 92, side wall 96 disposed at right angles to the inner and outer walls 92 and 94, respectively, and opposite side wall 98 which is radially oriented relative to the core tower 10 and aligned with the inner section 42 of the side wall 40 of module 12. Inside partition walls 100 and 102 depend integrally from the ceiling structure, and define a pair of bedroom areas 104 and 106, and a hallway area 107 which is aligned with the hallway 62 of the inner module 12 and communicates therewith through passageway 108 that registers with the passage 74 in the outer wall of the inner module 12. A doorway 110 is defined between the partition walls 102 and 100 to define access from hallway 107 to bedroom 104, while a doorway 112 between wall 92 and partition wall 100 defines access from hallway 107 to bedroom 106. Each of the doorways 110 and 112 has wall structure thereabove depending from the ceiling structure to complete the cellular construction of the module 32.

The side wall 96 of module 32 is spaced substantially from the opposed radial side wall 98 of the next adjacent module 32 so as to provide space therebetween for a patio slab 114 connected at floor level to both of the adjacent modules 32, and also to the outer edge of module 12 proximate doorway 68 for access.

FIG. 2a shows details of the outer wall 40 whereby the wall is made light in weight but nevertheless with great column strength. Thus, wall 40 is cast with relatively thin web portions 116 with vertical, spaced pilasters 118 projecting from the outer surface thereof, leaving the inner surface smooth as is usually desired for an inner wall surface. The lower edge of the wall is strengthened by retaining the thickness of the pilasters in a foot portion 119 of the wall.

Outlined in dotted lines in FIG. 2a are web portions 120 of the floor-ceiling structure, ceiling beams 122 that are rebar truss reinforced to provide great floor strength, and cornice beams 124 forming part of the ceiling structure for increased shear strength of the junctures with the walls. The web portions 120 of the floor-ceiling, ceiling beams 122, and cornice beams 124, are clearly shown in cross-sectional detail in FIGS. 3, 4, 5, and 7. Nevertheless, the overall positioning thereof relative to the modules 12 and 32 is well illustrated in FIGS. 2 and 2a.

FIG. 3 shows the connection of patio slab 114 to module 32 at the wall 98 thereof. Patio slab 114 is constructed similarly to the floor-ceiling structure cast into one of the modules, having web portions 125 with regularly spaced, transverse parallel beams 126 depending therefrom, and edge beams 127 having the same thickness as the beams 126. Edge beam 127, shown in FIG. 3, is supported on a horizontal rib 128 projecting outwardly from the wall 98 of module 32 near the upper edge thereof, with suitable pads 130 interposed between the edge beam 127 of the slab and the rib 128. An upwardly facing recess 132 is formed by complementary notches along the upper edges of the module 32 and slab 114, and angle weld plates 134 and 136 are cast in place at the bottoms of these respective notches, with suitable anchors extending from these weld plates into the concrete. A third weld plate 138 overlaps the two weld plates 134 and 136 and is welded along its opposite edges to the respective plates 134 and 136 to provide a strong, permanent bond between the module 32 and the patio slab 114.

FIG. 3 also illustrates how the lower edge of the wall 98 of the next module 32 above is secured to the module 32 primarily shown in FIG. 3. A weld plate 140 is cast into place on the lower edge of wall 98, and this is welded to the weld plate 138 which ties the patio slab to the module.

FIG. 4 illustrates the floor level connection between adjacent modules 12, where the wall 38 faces the opposite wall section 42, and FIG. 4 also shows connection of the lower edges of wall 38 and wall section 42, as well as inside wall 48, to the module floors. Looking at first to the left-hand side of FIG. 4, upwardly facing recess 142 is defined by complementary notches in the floors of the adjacent modules, and weld plates 144 are cast into these notches and are tied together by overlapping weld plate 146 which is welded to each of the two plates 144, thus securing the two modules 12 together at floor level.

Channel members 148 extend along the lower edges of walls 38 and 42, serving both as weld plates for securing the lower edges of the walls to the underlying floor structure, and as bottom anchors for pickup rods which extend upwardly through the walls to assist in the compression and handling of the cast modules after they are removed from the mold structure, as described hereinafter in more detail in connection with FIG. 17 of the drawings. The channel 148 at the foot of wall 42 is welded directly to the tie plate 146 before the other module, including wall 38 as viewed in FIG. 4, is lowered into place. Then, after the wall 38 is in place, as viewed in FIG. 4, sections of round rod 150 are disposed between the exposed corner of channel 148 at the foot of wall 38 and the underlying weld plate 144, and these sections of rod 150 are welded along the two resulting seams to secure the wall 38 to the underlying floor structure.

Looking now to the right-hand side of FIG. 4, upwardly facing recess 152 is cast into the floor directly above the wall 48 of the lower module, with weld plate 154 cast into the bottom of recess 152. Angle weld plate 156 is cast into the lower edge of the internal wall 48 of the module above, and is secured to the weld plate 154 by spaced rod sections 160 welded therebetween.

In order to allow self-adjustment and equalization of the bearing forces of the lower edges of the walls of an upper module against the corresponding floor portions of a lower module, elastomer washers, preferably of neoprene or the like, are disposed at spaced intervals along each of the upwardly facing channels in the floor into which the lower edges of the walls are placed, and then the upper module walls are lowered onto these elastomer washers. Such a washer 162 is illustrated in the right-hand portion of FIG. 4, although it is to be understood that a series of such elastomer washers may be disposed underneath any of the walls wherever desired for proper adjustment and equalization of the forces. Welding is generally applied then after the settling and adjustment of the modules on these neoprene washers. Then, after the welding has been completed, an epoxy grout is fed under pressure into the exposed portions of the upwardly facing recesses into which the lower edges of the walls are placed, as for example, the recesses 142 and 152 in FIG. 4, and the recess 132 in FIG. 3. This epoxy grout is forced in under the lower edges of the walls so as to substantially completely fill the spaces under the walls surrounding the neoprene pads, such as the pad 162 shown in FIG. 4. The epoxy grout expands when it sets up, to provide a total bearing under the edge of each of the walls. The epoxy grout serves also as a strong adhesive for further bonding the stacked modules together.

FIG. 5 illustrates the weld plate connection between modules 12 and 32 proximate the outer wall 36 of module 12 and the inner wall 92 of module 32, this connection being substantially the same as that illustrated in the left-hand portion of FIG. 4. However, angle weld plates 164 are disposed in the bottom edges of walls 36 and 92, rather than the channel members in the reference part of FIG. 4.

FIG. 6 illustrates in detail the manner in which the inner modules 12 are peripherally secured about the core tower 10 by means of the horizontal, annular connecting web 88. A annular recess 166 is provided in the outside of the core structure 14, and a complementary arcuate notch or recess 168 is provided in the upper edge of inner wall 34 of module 12 at floor level. The web 88 is cast in place, and suitable reinforcing steel 170 spans the width of the web 88, while rebar 172 reinforces the connection of the inner edge portion of web 88 with core structure 14, and rebar 174 reinforces the connection of the outer edge portion of web 88 with module 12. The rebar 172 is cast in place in the core structure 14 as the latter is slip-formed, while the rebar 174 is cast in place in the module 12.

FIG. 7 illustrates the floor connection between floor sections 62 and 107 of the hallway. Notches in the opposed corners of the floor sections 62 and 107 are provided with cast-in weld plates 176 which are each set at approximately a 45 degree angle relative to the horizontal so as to define approximately a 90 degree angle therebetween. Square rod sections 178 are seated between the weld plates 176 and welded to each of the plates 176 to effect the connection, and then the recess is filled with epoxy grout 180 to floor level.

FIG. 8 diagrammatically illustrates a simplified assembly line type arrangement for precasting reinforced concrete building modules according to the invention, finishing the modules, and installing various sub-assemblies therein so as to complete the modules to a maximum possible extent at the production plant, and thereby minimize labor costs at the construction site.

In the illustration a single assembly line 182 is illustrated. However, it is to be understood that if desired a similar assembly line 182 may be disposed on the opposite side of the concrete batch plant, arranged symmetrically relative to the assembly line 182 that is illustrated.

The assembly line 182 has parallel railroad-type tracks 184 extending along opposite sides thereof, upon which an overhead stiff leg crane 186 rides. The crane 186 and tracks 184 are shown more in detail in FIG. 17 of the drawings. In general, the various stations are sequentially spaced between the tracks 184.

The initial station of the assembly line, located ahead of the casting station, is a rebar prefab station 188 wherein sheets of high tensile steel wire mesh reinforcement and rebar truss structures hereinafter to be described more in detail are welded together generally in the configuration required to fit the concrete mold, and suspended from an overhead I-beam frame, also shown in FIG. 17 and described in connection therewith, which overhead I-beam frame generally matches the wall plan of the module. The prefabricated wire mesh and rebar structure is shown in phantom in FIG. 8, and is designated 190. This rebar structure 190 is then moved by the overhead crane 186 to the right in FIG. 8 to the casting station 192, which includes a concrete form pit that contains the various hydraulically actuated mold forms generally designated 194, which will hereinafter be described in some detail. Offset to one side of the assembly line is an automatic concrete batch plant 196 which has concrete pump 198 associated therewith for pumping concrete under high pressure through suitable strategically located conduits 200 into the bottom areas of the wall cavities in the mold for filling the wall cavities with a minimum of air bubbles. An articulated overhead conveyor 202 also conveys concrete from the batch plant 196 for pouring the floor-ceiling part of the module which overlies the mold forms 194. Conventional vibrator means (not shown) is associated with the mold members for consolidation of the concrete in the mold.

A hot air cover 204 is laterally movable from an offset position as illustrated in FIG. 8 at one side of the assembly line wherein it exposes the casting station 192, to a position substantially completely covering the casting pit 192 for entrapping hot air therein. As soon as the concrete is poured, hot, dry air is pumped into the casting station 192 under the cover 204, to remove as much excess moisture from the concrete as possible and provide a hot air cure for the concrete. Preferably, the temperature in the casting station is raised from ambient temperature about 10° F. every ten minutes until a temperature of 120° F. is reached, and this temperature of about 120° F. is maintained preferably for about three hours, at which time the hot air flow is stopped and the cover 204 withdrawn from over the casting area.

With the hot air cure, preliminary shifting of the inside mold members to allow for shrinkage is preferably timed to occur approximately forty minutes after pouring, although it is to be understood that this timing will depend on various factors, including but not limited to the type of concrete used, the curing temperature, the humidity, thickness of the poured walls, and the like.

Preferably, the preliminary inner mold shift to accommodate shrinkage occurs as close as can be safely timed to when shrinkage commences, but before substantial shrinkage has occurred. Thus, the preliminary shift of the inner mold members to accommodate shrinkage occurs after the poured module has achieved substantial structural stability as a result of some curing, but before substantial shrinkage.

With the hot air cure the module can be removed from the mold within about an hour and ten minutes after the concrete has been poured. However, it is not generally safe to move the module sooner than about three hours after the concrete has been poured. A pasty, clay-like surface skin appears to form on the concrete immediately adjacent to the mold panels when the concrete first starts to set up, and this pasty skin is the last portion of the concrete to set up, and lasts until about an hour and a half after the concrete has been poured. Once this pasty skin disappears, and the surface areas of the poured module set up, it becomes very difficult to strip the molds from the cast module. Accordingly, it is preferred to remove the mold members from the poured module after the module has set up sufficiently to retain its shape in a stable manner, but before the pasty surface skin has disappeared from the concrete. In the production of test samples wherein the aforesaid hot air cure has been employed, the mold has been removed from the cast module satisfactorily within a range of from about one hour ten minutes after pouring to about one and one-half hours after pouring.

Despite the fact that the mold forms will normally thus be removed from the cast module within about one and a half hours after the concrete has been poured, nevertheless, the poured module will normally not be sufficiently strong to be safely moved until about three hours after pouring, at which time the module can be shifted from the casting station 192 to the next station for further work thereon, provided that the walls of the cast module are placed under vertical compression, as described hereinafter in connection with FIG. 17 of the drawings. As soon as the module can thus be moved away from the casting station 192, the mold forms can then be prepared for pouring the next module in the sequence. Such preparation, including steam cleaning of the mold forms, lubrication of the forms, preparation of the reinforcing steel, and the like, is likely to take approximately another hour, so that the maximum rate of production in the assembly line 182 of FIG. 8 will be on the order of about one of the precast building modules every four hours. Such rapid production is only possible with substantially complete automation of the mold forms, which is permitted by the solid inner mold members of the present invention.

Although the molding apparatus, generally described 194, as illustrated in FIG. 8, is at a stationary location in a single casting station 192, it is to be understood that the rate of production can be greatly increased by arranging a plurality of casting stations, as for example, three or four thereof, side-by-side, transversely relative to the direction of the assembly line, and having the molding apparatus 194 movable laterally from station to station. With such an arrangement, the molding apparatus will not have a period of disuse between the time it is removed from the cast module and the time that the module is strong enough to be moved away and preparations then made for another casting operation. Instead, as soon as a first module has been cast and the mold removed therefrom, the mold can then be shifted laterally to the next casting station, quickly cleaned and lubricated, and used for casting a second module with very little down time, and the first module can continue curing while the second module is setting up in the form. Then, the form can be removed from the second module and moved to the next casting station for casting a third module while the first and second modules are curing. If desired, a fourth module can be cast in this same sequence. By the time the mold is removed from the third or fourth module, the first module can be moved along to the next station in the assembly line and the mold shifted back to the first casting station and used to cast another module at that station.

Although the cast module can be moved approximately three hours after pouring, provided the walls are placed under vertical compression to prevent cracking, nevertheless, it takes approximately six days for the cast module to become fully cured. This six days can be utilized to full advantage because of the precision tolerances to which the walls can be cast, and because of the accessibility of the open bottoms of the modules for the installation of various large assemblies, including inlet and outlet plumbing, heating and electrical equipment, cabinets, wardrobes, doors, and finished plumbing, and the like. This time also allows for cleaning, rubbing and patching the module as necessary, application of any tile work that is desired, installation of glass, painting, and the like. Accordingly, the time during which the modules must be kept at the production plant anyway, in order for them to become fully cured, is utilized to accomplish the major finishing and assembly work, so that such time is not wasted at the building site. The use of major sub-assemblies, and the installation thereof at the central plant, on an assembly line basis, provides a major saving in labor costs, as compared with conventionally required installation of most equipment at the building site and performing of most finishing steps at the building site. Further, if a seismic core tower is desired for the structure, as for example, in a high rise apartment or other building structure, such seismic core tower can be slip-formed during the time that the precast building modules, according to the invention, are being produced at the central plant, and the overall time required will be further economized.

Although the various finishing and assembly steps can be performed in different orders, a practical order for the various steps, which will depend to a large extent upon the progress of the curing in the precast module, is suggested by the further sequence of stations in FIG. 8, after the casting station 192. Thus, the next station 206 is for cleaning, rubbing and patching, as may be required, and also for any desired tile work. Patching, of course, is minimized by the effective seal of the solid inside mold forms employed in the present invention.

The cast module that is in the process of curing and moving along the assembly line of FIG. 8, is diagrammatically illustrated and is designated 208. The module 208, after leaving station 206, moves next to station 210, where the rough plumbing sub-assemblies are installed. These generally include a sub-assembly for incoming hot and cold water, and a separate sub-assembly for drainage, as will hereinafter be described more in detail in connection with FIGS. 39 and 40 of the drawings.

At the next station 212 heating and rough electrical equipment may be installed. Next, at station 214, large sub-assembled units such as cabinets, wardrobes, kitchen and bathroom complexes, including finished plumbing, doors, and the like, can be installed.

At the next station 216, glass and glazing may be applied, the arches finished, and curing will have progressed to the point where painting can be done.

After leaving the station 216, the modules then move out into a storage area, generally designated 218, where the modules can remain for completion of the desired curing cycle if it has not already become completed, and for transport to the building site.

FIGS. 9 to 18 of the drawings illustrate in detail a presently preferred method and apparatus for precasting reinforced concrete building modules according to the present invention, as well as the resulting product.

As best seen in FIGS. 9, 12, and 17, the molding apparatus is disposed primarily in a concrete form pit 220 below ground level, the mold forms being movable between a retracted position in the pit below ground level and an extended position above ground level where the casting occurs. Thus, the module is cast above ground level in a position where it can be moved horizontally to the next station with the molding apparatus retracted into the form pit 220 so as to completely clear the cast module.

A rigid, horizontally disposed, primary frame 222 is vertically slidably movable on a series of vertical guides 224 between a lowermost, retracted position as illustrated in FIG. 17, and an uppermost casting position as illustrated in FIG. 9. The uppermost limit of travel of primary frame 222 is defined by stop plates 226 proximate the upper edge of form pit 220, which serve also to accurately horizontally stabilize the primary frame 222 in its uppermost or casting position, as shown in FIG. 9. A plurality of transversely movable, hydraulically actuated locks 228 are spaced below the stop plates 226 for releasably locking the primary frame 222 in its uppermost or casting position, as shown in FIG. 9.

Each of the outer mold panels of the apparatus is provided with one or more horizontally movable supports 230, which are movable on beams 231, forming a part of the primary frame 222, by respective hydraulic actuators 232. This movement of the supports 230 is between an open, outer position wherein the outer mold panels 234 carried thereby are spaced substantially laterally outwardly from the cast module as best illustrated in FIG. 17, and a closed, inner, casting position, as best shown in FIGS. 9 and 12, wherein the outer mold panels 234 define the outside of the mold cavity. The outer mold panels 234 include inner skins which define the mold shape, and are preferably composed of steel coated with Teflon, or other suitable coating which will tend to prevent the concrete from sticking to the skins. The outer mold panels 234 also include a series of vertical braces 238 which back up the skins 236, and as best shown in FIG. 13, horizontal beams 239 extend the width of each of the outer mold panels 234, to provide great rigidity to each of the outer mold members. While the outer mold panels are illustrated as being slidably mounted for lateral movement, they may alternatively be pivotally mounted for lateral swinging movement about horizontal pivots disposed below the lower edges of the cast modules.

The two largest solid inside mold members 240 and 242 are shown in FIGS. 9 and 17, and details thereof are shown in FIGS. 10, 11, 13, 14 and 15. These solid inside mold members 240 and 242 have respective main frames 244 and 246, and respective solid or continuous rigid skins 248 and 250. Rigidity is provided to the side wall portions of the inside mold skins 248 and 250 by a combination of the heavy main inside mold frames 244 and 246, respectively, and a series of horizontal spacer beams 252 and vertical braces 254 which back up the side wall portions of the skins. The ceiling portions of the inside mold skins 248 and 250 are supported on spaced, parallel, horizontal braces 255, which in turn are supported on the main inside mold frames 244 and 246.

The main frames 244 and 246 of the inside molds include rigid beam portions which are vertically oriented, as best shown in FIG. 9, and these are slidably engaged with a series of spaced, parallel, vertical guides 256 for vertical sliding movement of the inside molds 240 and 242 between lowermost, retracted positions, as shown in FIG. 17, wherein the inside molds 240 and 242 are completely withdrawn from the cast module and spaced therebelow so that the module is clear to be moved horizontally away from the mold apparatus and uppermost casting positions, as shown in FIGS. 9, 10, 11, and 14. Vertical shifting of the inside molds 240 and 242 between these extreme lowermost and uppermost positions is shown as being accomplished by means of respective hydraulic rams 258 engaged between the base of the form pit 220 and the respective main frames 244 and 246 of the inside molds. However, it is to be understood that if desired, any other suitable means may be employed for actuating the inside molds between their lowermost and uppermost positions, as for example, worm gear drives, cable lift means, rack and pinion lift means, or other means, within the scope of the invention.

As best illustrated in FIGS. 9 and 17, the side portions of the inside mold skins 248 and 250 taper inwardly in a continuous taper from the bottom to the top. A typical inside wall height is about eight feet, and for such height a taper for each inside mold member of about one inch has been found to be satisfactory in experimental module production, such one inch taper being considered as the included taper of opposite sides of the mold member, so that the taper for each skin surface of the inner mold member would be one-half inch. This amount of taper permits the necessary clearance to be provided for shrinkage of the concrete as it is setting up by the simple expedient of lowering each of the inside mold members a short distance, as for example, about one inch. This amount that each mold member is lowered to accommodate shrinkage may be varied according to the amount of shrinkage that any particular type of concrete has. This small amount of downward shifting of the inner mold members to accommodate shrinkage still leaves the side wall skins of the inner mold members closely spaced proximate the cast walls of the module, and as shrinkage occurs, this spacing becomes closer. Such close spacing between the inner mold members and the walls provides the necessary amount of support to assure that the walls will maintain their cast shapes, and will not tend to break down.

However, if full ceilings are cast as in FIGS. 9 to 18, they are left unsupported by the inside mold members when the mold members are dropped down to allow for shrinkage, and for this reason, separate means is provided to assure that the ceiling will not collapse downwardly, such as the introduction of fluid pressure, preferably air pressure, between the top of the inner mold member and the cast ceiling, or the inclusion of self-supporting rebar truss structure in the ceiling beams, or both. If fluid pressure, such as air pressure, is employed to stabilize the ceiling structure when the inner mold forms are dropped to accommodate shrinkage, this pressure is preferably in an amount to substantially counterbalance or compensate for the weight of the ceiling structure, and is accordingly a relatively low pressure, on the order of about one-half to one pound per square inch.

The mold tapering has the further advantage of immediately providing clearance for withdrawal of the mold members from the cast module as soon as such withdrawal movement is commenced from the slightly lowered shrinkage position of the mold members. This allows free withdrawal movement of the inner mold members, without causing abrasion or stresses to be applied to the walls, which are still quite vulnerable to damage since this withdrawal movement occurs typically between about an hour and ten minutes and an hour and a half after the concrete is poured, and the concrete is still in an early stage of the setting up process.

A further utility of the tapered inner molds is the production of module walls which taper from a relatively thick cross-section proximate the ceiling to relatively thin cross-section proximate the free, lower edges. This provides the maximum wall shear strength near the roots of the walls where they join the ceiling structure, which is the region of greatest stress, while nevertheless saving a great deal of weight in the lower portions of the walls where the additional strength is not required. The junctures between the walls and ceilings are further greatly strengthened by cornice beams 124 which can be conveniently cast with the solid, downwardly shifting type inner molds of the present invention. Such cornice beams would be extremely difficult if not impossible to cast with conventional break-apart inner molds, as the molds would have to be even more complicated than they already are, and the complexity of break-apart molds is one of the big problems therewith.

The same thing is true with regard to the casting of the ceiling beams 122. These also would be very difficult if not impossible to cast with conventional break-apart type internal molds, but they are simple to cast with the solid, downwardly shifting inner mold members of the present invention. In fact, the angular cross-sectional configurations of the inner mold skins for casting the cornice beams 124 and the ceiling beams 122 add considerable structural strength to the mold skins. The ceiling beams 122 are provided as strong structural members which carry the major portion of the floor loading in the finished building, thereby permitting the major portions of the floor-ceiling structures to be the relatively thin web portions 120, and thereby additionally effecting a great saving in over-all weight of the modules. The ability to cast these strong ceiling beams 122 by the present casting method allows modules to be cast which have wider floor expanses than those of prior art modules, with lighter weight and generally greater structural strength. It will be noted that the depth of the ceiling beams 122 is the same as the depth of the cornice beams 124 at their edges, whereby the ceiling beams 122 constitute structural extensions of the cornice beams 124, thereby further increasing the strength of the corner portions of the modules.

As best seen in FIGS. 9, 15, and 17, the module is cast over an I-beam frame 260 which matches the wall plan of the module as such plan is best illustrated in FIG. 12, the I-beam frame 260 defining the bottom portions of the mold cavity along the lower edges of the module walls. By thus matching the wall plan of the module, the I-beam frame 260 is capable of providing a complete, uninterrupted platform upon which the module may be molded, while nevertheless not presenting an obstruction to the vertical shifting movement that is required of the inner mold members. The I-beam frame 260 is preferably a rigid, integrally welded structure, and is supported on a plurality of supports 262 which project vertically upwardly from support bases 264 anchored on the bottom of concrete form pit 220. The vertical supports 262 are sufficiently narrow to provide the necessary clearance for full vertical movement of the inside mold members between their uppermost and lowermost positions.

A plurality of stripping jacks 265 are engaged between the primary frame 222 and the I-beam frame 260 for breaking the cast module loose from the mold forms. A plurality of air nozzles 266 in the ceiling portions of each of the inside mold members receive air under pressure from any suitable source (not shown) and distribute this air pressure into the region between the upper surfaces of the inside mold members and the cast ceiling structure to break the seal when the inside mold members are initially dropped from the position of FIG. 10, which is the pouring position a short distance to the position of FIG. 16, to allow shrinkage of the concrete. Air pressure is then preferably maintained in the space 269 shown in FIG. 16 between the top of the inner mold form and the ceiling to balance the weight of the ceiling until the inside mold form is finally removed from the module. Thus, the air introduced through the nozzles 266 serves the twofold purpose of breaking the seal and of supporting the wide ceiling structure before the concrete has set up sufficiently to be fully self-supporting.

The steel reinforcement for the module is primarily in the form of high tensile steel wire mesh which requires a minimum amount of skilled labor to prefabricate into a welded sheet cage-like structure that can be suspended into the wall cavities of the mold to provide the wall reinforcement, and disposed in overlying relationship over the tops of the inside mold members for ceiling reinforcement. This high tensile steel wire mesh reinforcement can be thus suspended and overlaid in any number of sheets of the reinforcing material or can be welded together as a total cage-like unit, as desired. This wire mesh steel reinforcement is much easier to dispose in the mold than conventional rebar type reinforcement, and is particularly compatible with the casting method and apparatus of the present invention because of the thin web portions 116 of the walls and 120 of the ceilings. While the present invention allows a substantial weight saving by permitting such thin web portions to be cast into the structure, nevertheless, it is extremely difficult to adequately reinforce such thin web portions with conventional rebar.

However, the ceiling beams 122 provide regions of substantial depth wherein rebar type reinforcement can be conveniently placed, and these ceiling beams 122 are structures which carry substantial loading in the final building structure. Accordingly, advantage is taken of the depth of the ceiling beams 122 to include therein vertically oriented rebar truss structures 272, best shown in FIGS. 10, 11, and 14, which include a pair of vertically spaced, parallel reinforcing bars 274 and 276 that extend the length of each ceiling beam 122, the truss being completed by an intermediate reinforcing bar 278 which angles or zigzags back and forth between the spaced reinforcing bars 274 and 276, and is welded at each point of contact with the straight reinforcing bars. This rebar truss 272 is preferably centrally located in each of the ceiling beams 122, as shown in FIG. 14, and is disposed immediately underneath the ceiling portion of the wire mesh reinforcement 270 which covers the entire ceiling area.

These rebar truss structures 272 in the ceiling beams 122 are preferably made of sufficient strength and rigidity to make the entire ceiling structure self-supporting by the time the inner mold members are shifted downwardly to accommodate shrinkage of the concrete, even without the supporting force of air pressure introduced through the nozzles 266. Nevertheless, complete security against any possibility of sag occurring in the ceiling structure is provided by the combination of the rebar trusses 272 and the balancing cushion of air pressure under the ceiling structure provided through the air nozzles 266.

FIGS. 12 and 18 illustrate the arrangement of inside mold members required to produce the wall plan of the building module 12 as described hereinabove in detail in connection with FIG. 2 of the drawings. This arrangement includes the two main inside molds 240 and 242 which define the livingroom and kitchen areas 54 and 58, respectively, and further inside mold members 280, 282, and 284, which respectively define the closet area 56, the hallway area 62, and the bathroom area 60.

It will be understood that the outside mold forms must be break-apart forms in order to allow lateral outward movement of the outer mold forms to clear the cast module. However, this does not present the serious problems that are presented by break-apart inside mold forms, as discussed in detail hereinabove, since each of the outside forms can cover an entire outside wall span. Thus, for casting a typical building module, such as the module 12, only four outside mold panels are required, and each of these can be a unitary structure that is not required to break apart or fold at the middle. These four solid outer mold members come together at four mitered corners 286 which are the only regions of separation that must be sealed, and it is a simple matter to provide a complete seal at each of these four corners. As shown in FIG. 13, the seal can be effected by locking the corners together by a pair of overlapping U-shaped locks 288 on opposed corners of the horizontal external mold beams 239, and securing the corners together by inserting a tapered locking pin 290 through the U-shaped locks 288. An inflatable elastomer seal 292 carried in a suitable support channel 294 on one of the outer mold members completely seals the juncture between the mating edges of the outer mold panel skins 236.

There is no outer mold ceiling panel required, so there is no problem of trying to provide a good seal between wall and ceiling panels as there is with break-apart type inside mold members. Hence, the simple four panel external mold is all that is required, and the only juncture lines that might show on the finished cast module are exactly at the corners thereof, which can be easily touched up if necessary. With reasonable care in the preparation of the outer mold members, there will not be any other outside areas likely to have defects from the molding.

Inflatable elastomer seals are also employed effectively in the present invention to seal the mold cavities at the lower edges of the module walls where the mold panels close against the horizontal upper web 296 of the I-beam frame 260, as shown in FIGS. 15 and 25. It will be seen in these figures that outer and inner mold skins 236 and 248, respectively, close about the horizontal web 296 of the I-beam structure 260, and to insure a complete seal in this region against loss of moisture from the concrete, a pair of inflatable elastomer strips is disposed immediately underneath the web 296, with one strip on each side of the vertical web 300 of the I-beam, the elastomer strips 298 being retained up against the horizontal web 296 by respective bracket strips 302 fastened to the vertical I-beam web 300. By thus being contained between the horizontal web 296 and the brackets 302, the elastomer strips 298 when inflated are forced outwardly for secure moisture sealing engagement of their serrated outer edges against the mold skins 236 and 248.

The vertical web 300 of I-beam frame 260 also provides convenient support means for a series of conduits 304, 306, and 308, which can be bracketed along the I-beam structure and employed to furnish water or steam under high pressure for cleaning the forms between casting operations, pressurized form release agent which can be sprayed on the forms prior to casting, or other purpose.

FIG. 17 illustrates the module 12 suspended from overhead crane 186, after the mold forms have been stripped therefrom by the outer mold forms first shifting laterally outwardly preferably about three feet from the molding positions, and then both the outer and inner mold forms lowered down into the form pit 220 so as to completely clear the cast module 12. After the mold forms have thus been stripped from the cast module, the module is preferably left in the position shown in FIG. 17 until approximately three hours have elapsed from pouring, i.e., until the cast concrete has sufficient strength for the module to be moved. When the module can be moved, the crane 186 is actuated to synchronously raise a plurality of cables 310 so as to raise the module in level position above the I-beam frame 260, and then the crane 186, with the module 12 suspended therefrom, rolls along track 184 on its wheels 312 to the next station.

The primary frame 222 can be raised and lowered by any conventional means which assures accurate horizontal disposition thereof in all positions of vertical movement, as for example, by hydraulics, synchronized worm gear drives, cables, chains, or other conventional means. A particularly reliable means for actuating the primary frame 222 for vertical movement while at the same time maintaining the frame horizontal, is the conventional "fork-lift" mast mechanism. Bcause such mechanisms for raising and lowering the primary frame 222 are conventional in nature, and in order to avoid undue complication of the drawings, the particular mechanism employed for raising and lowering the primary frame 222 has not been illustrated.

While hydraulic cylinder means has been illustrated for raising and lowering the inner forms, it is to be understood that other conventional mechanisms can be employed within the scope of the invention for raising and lowering the inner forms, as for example, mechanisms like those just described for raising and lowering the primary frame 222.

The first step in stripping the forms from the module is the lateral outward movement of the outer mold members by hydraulic actuators 232, and then the primary frame 222 with all of the outer mold members supported thereon, and the inner mold members, are synchronously lowered to clear the module. This initial form stripping step of breaking the outer mold forms laterally outwardly away from the cast module, either by sliding movement as shown, or by pivotal movement, is an important step in practicing the present invention, as it allows window apertures, exterior awnings and eyebrows, various exterior finishes or textures, pilasters, plumbing apertures, and the like, to be cast directly into the modules, and these irregular configurations are completely cleared by the lateral outward movement of the outer mold members before they move downwardly. This lateral outward spacing of the outer mold members, as best illustrated in FIG. 17, allows workmen to get inside of the mold to quickly and simply snap window mold forms and door frames into place in the mold, and to adhesively bond rubberized external texture sheets to the outer mold panels. Window mold forms are also releasably attached to the outer mold forms, while door frames are supported in erect position on the I-beam frame 260.

As shown in FIG. 17, the cast module 12 is actually suspended from an overhead I-beam frame 314, which in turn is suspended from the crane cables 310. A series of suspension rods 316 is cast along the exterior walls of the module 12, the rods 316 being secured at their lower ends to channel members 148 which are cast in place along the lower edges of the walls, the rods terminating at their upper ends in recessed couplings 318, which provide connection with respective hydraulic rod jacks 320 supported on the overhead I-beam frame 314.

The overhead I-beam frame serves a number of important functions in the casting and subsequent handling of the module. Thus, the I-beam frame 314 serves as support means from which the reinforcing mesh can be suspended down into the wall cavities of the mold, thus minimizing time-consuming and perhaps dangerous efforts of workmen attempting to arrange reinforcing steel directly within the mold cavities. The reinforcement sheets can be hung on conventional support clips attached to the bottom of overhead frame 314, these clips being of the type that uncurls and pulls out of the cast concrete when the overhead frame is ultimately separated from the module.

The overhead I-beam frame 314 also serves as a means for supporting the weld plates that are cast directly into the floor of the module for welding the module to other adjacent modules. Such weld plates, which are shown in FIGS. 3 to 5 and 7 and are described in detail in connection therewith, may be simply adhesively bonded to the overhead frame 314 for the casting operation, and then they will simply break loose from the frame when the frame is ultimately separated from the cast module.

The overhead frame additionally serves as a form for impressing channels or keyways generally designated 322 in FIGS. 17 and 18, and corresponding to various channels and recesses illustrated in FIGS. 3 to 5 and 7, in the upper surface of the module for connecting the unit above. In some instances, the overhead frame 314 will itself be the form for casting the channels or keyways 322, and in other instances, removable strips may be bonded adhesively under the frame 314 to define the desired channel or keyway configurations. The various weld plates that are temporarily bonded under the overhead frame 314 will, of course, be cast into the module in the channels or keyways 322.

The overhead I-beam frame 314 further serves as support structure from which the concrete can be finished on the top of the module.

The overhead frame 314, being a very rigid structure which has the same plan as the wall plan of the module, provides reaction means against which the entire wall structure may be placed under compression, so that entire module can be held tightly against warping or cracking, thereby permitting the cast module to be moved from the casting station in a relatively early stage of the setting up process of the concrete. Thus, approximately three hours after the concrete has been poured, it will have achieved sufficient compressive strength to permit application of substantial vertical compression to the walls of the module. This vertical compression is applied by synchronously and uniformly actuating the hydraulic rod jacks 320 which pull upwardly on the suspension rods 316, and accordingly, on the channel members 148 along the lower edges of the walls. Accordingly, the compression force of the hydraulic rod jacks 320 is applied from the lower edges of the walls at channels 148, and compression is applied uniformly vertically through the walls, with the upper edges of the walls being compressed through the ceiling structure against the overhead I-beam frame 314. In this manner, the module is tightly secured to the overhead frame 314, with all walls under compression, and the module can be handled without likelihood of damage by simply handling the overhead frame 314 as, for example, raising the frame 314 by means of the crane cables 310, and then moving the frame 314 laterally by moving the entire crane 186 laterally.

Although the vibrator means for consolidating the concrete is not shown in the drawings, it will be understood that a conventional vibrator may be employed, and if desired, this can be attached to the primary frame 222 so as to cause vibration of the entire outer mold structure. It will also be understood that automated, timed control of the mold members to cause the correctly sequenced movements thereof can be tape-controlled by conventional automated control means from a suitable control console (not shown).

FIG. 19 is a fragmentary horizontal section similar to FIG. 12, but illustrating the casting of an outer module 32, like that shown in FIG. 2. The apparatus is generally the same as that hereinabove described in detail for the casting of a module 12, except for the configurations of the inner and outer mold members and their supporting structures. Accordingly, the outer mold panels 234a are laterally shiftably supported on a primary frame 222a, while inner mold members 324 and 326 define the bedroom areas 104 and 106, respectively, of module 32, and inner mold member 328 defines hallway area 107 of module 32.

As shown in FIGS. 19 to 21, the present system is capable of accurately duplicating in the cast concrete any outside building or home finish, as for example, the brick finish 330, or the rustic wood finish 332, that are shown in FIG. 20. Used brick, redwood paneling, or any other desired external finish can also be duplicated. Such duplication is accomplished by molding a soft, flexible elastomer sheet directly off of an authentic finish by utilizing a liquid elastomeric substance which will set into the resilient, soft, flexible consistency. An example of a suitable elastomeric material for this purpose is a soft silicone rubber composition. This elastomeric sheet, designated 334, in FIGS. 19 and 21, is releasably, adhesively bonded to the inside surface of the appropriate outer mold panel skin 236a, so that the authentic impression that was cast into the elastomeric sheet 334 will be reproduced in the outer surface of the outer wall 94 of the cast module 32.

Similar means can be employed for duplicating wood paneling on one or more inner wall surfaces of the cast module, although with the solid, tapered inner mold members which are vertically shiftable a short distance to accommodate shrinkage, and then out of engagement with the module, wood paneling duplication on an inside wall surface would involve a paneling having vertical grain orientation.

FIG. 22 illustrates the manner in which a window aperture 336 is cast into an external wall, such as the wall 94, according to the present invention. A window mold frame 336 having substantially the same thickness as the spacing between the inner and outer mold skins is releasably snapped into its operative molding position of the inner surface of the outer mold form, and the window mold is completed by an elastomer window aperture shaping plug 340 which extends around the periphery of frame 338 and provides a seal between the inner and outer mold panels. When the outer mold panel breaks away laterally, the window mold frame 338 will either shift laterally with it or be manually removed from the inside of the elastomer shaping plug 340, and then the plug 340 can be stripped away from the window aperture 336. The window aperture 336 includes a flange portion 342 about which a two-part aluminum window frame 344 is clamped and sealed, as shown in FIG. 23.

FIG. 24 illustrates the manner in which a steel door jamb 346 is integrally cast into a wall in accordance with the present invention. FIG. 24 is a vertical section taken from FIG. 18, illustrating the door jamb and associated molding apparatus for an outer doorway, but it will be understood that a similar door jamb 346 and similar molding apparatus will be employed in the same manner for inside doorways. As shown in FIG. 24, a mold frame 348 is disposed in erect position on the lower I-beam frame so as to extend upwardly in the wall molding cavity. An elastomer door jamb seal 350 is fitted around the outside of the mold frame 348, and has side wall portions 352 which carry the steel door jamb 346 therebetween so as to center the door jamb 346 in the wall cavity of the mold. An adjustable door stop 354 is connected to the inside surface of door jamb 346 by screws 356 for final door alignment.

After the mold forms have been stripped away from the cast module, the frame 348 is removed from the elastomer seal 350, and then the seal 350 is stripped off of the cast door jamb and the adjacent rounded wall edges 358 molded thereby.

FIG. 26, which is a vertical section off of FIG. 12, illustrates the manner in which an aperture 360 may be cast into an external wall of a module according to the present invention to accommodate plumbing or other fixture. An elastomer blockout member 362 is mounted on a suitable support 364 that is attached to an outer mold panel 234, the blockout member 362 extending through an opening 366 in the outer mold skin 236. The elastomer blockout member 362 extends outwardly as a gasket so as to seal against the outside of the skin 236, and if desired, may be hydraulically shifted laterally relative to the mold panel 234 for independent movement relative to the panel 234 by hydraulic actuator means 368.

Figure 27:
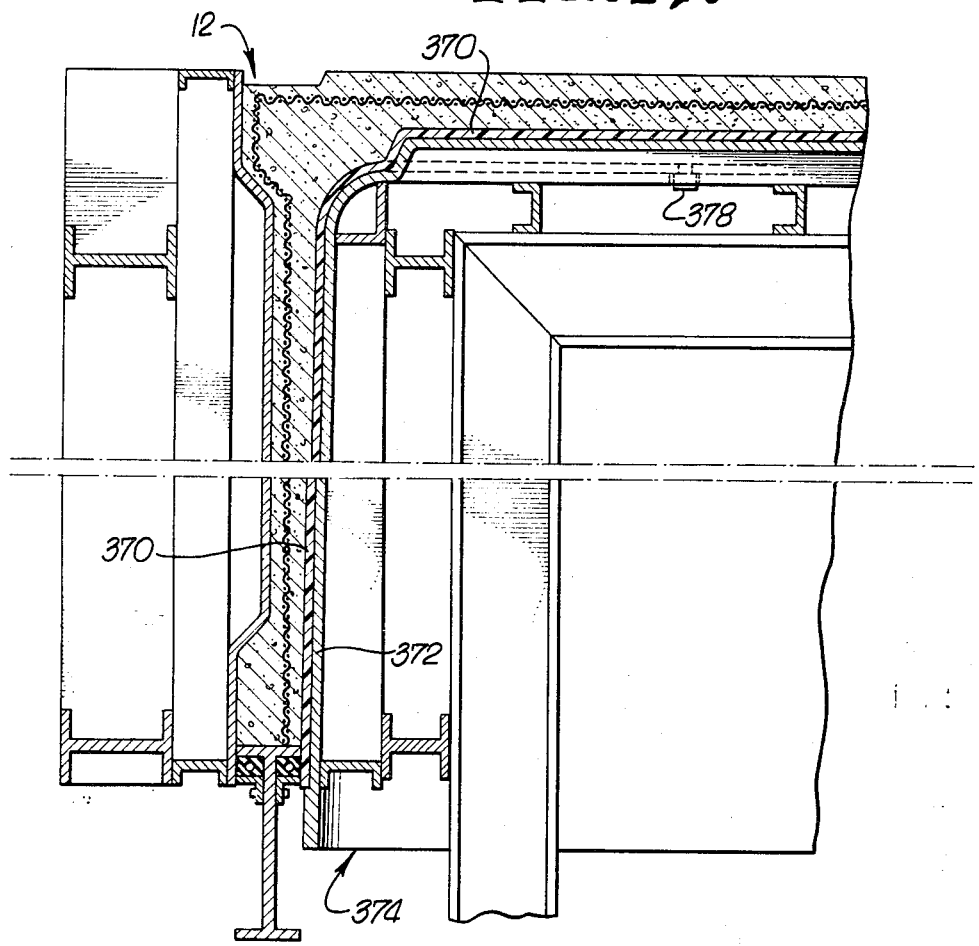
FIG. 27 is a vertical section illustrating a second form of casting apparatus and method employing a fiber glass reinforced plastic sheath over the solid internal mold member.
Figure 28:
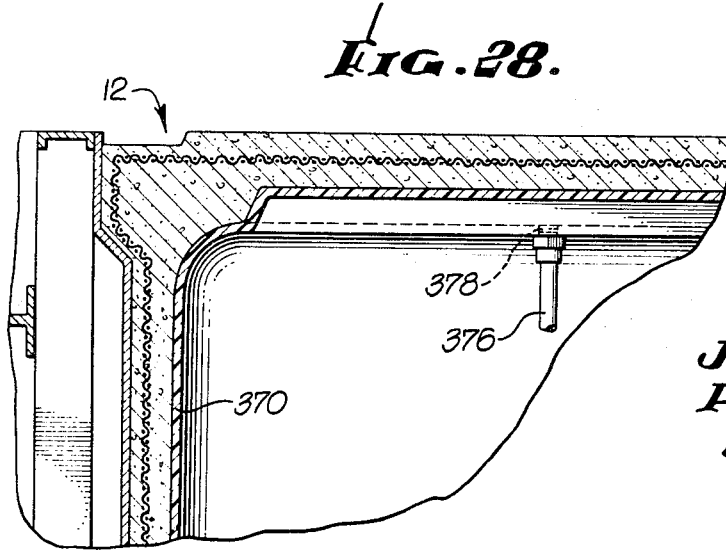
FIG. 28 is a fragmentary vertical section similar to FIG. 27, but illustrating the cast structure and fiber glass reinforced plastic sheath associated therewith after withdrawal of the solid inner mold structure therefrom.

FIGS. 27 and 28 illustrate a second type of inside mold apparatus which is substantially the same as the apparatus illustrated in FIGS. 9 through 18, and described in connection therewith, except for the use of a fiber glass reinforced sheath 370 which is slipped over the mating skin 372 of the solid inside mold member generally designated 374. The fiber glass reinforced resin sheath 370 is preferably made similar to conventional boat hull "fiber glass" material, with a thickness on the order of between about one-quarter inch and three-eighths inch.

With the use of the sheath 370, the concrete is introduced into the mold and vibrated in the same manner as with a solid mold not having the sheath 370 thereover, at which time the sheath 370 is fully supported by the solid skin 372 of inside mold member 374. The concrete is then allowed to set up sufficiently to retain its shape on the generally rigid sheath 370, i.e., approximately one-half to one hour, at which time the solid inside steel form 374 is lowered completely out of engagement with the sheath 370. The fiber glass reinforced resin sheath 370 has sufficient rigidity to hold the concrete in cast shape, but also has sufficient flexibility and give to accommodate shrinkage of the concrete. The cast module 12 with the solid inside mold member 374 thus withdrawn, and still supported by the sheath 370, is illustrated in FIG. 28.

Then, when the concrete has set up to a sufficient strength to withstand the forces involved, as for example about two days, the sheath 370 is blown free of the cast module 12 by introducing air under sufficient pressure through an air hose 376, which is releasably coupled to a port member 378 in the roof part of the sheath 370. Air pressure thus introduced between the ceiling part of the sheath 370 and the corresponding part of the module, bows the top panel of the sheath 370 downwardly so as to draw the upper corners of the sheath 370 inwardly sufficiently to allow the sheath 370 to be blown free. As soon as the sheath thus breaks free, the air pressure is relieved, and the sheath can be easily withdrawn.

Fiber glass reinforced plastic sheaths 370 can be used over and over again many times, and a series of the sheaths 370 will be employed in assembly line production.

FIGS. 29 to 32 illustrate a third form of solid inside mold wherein shrinkage of the concrete is accommodated by an inflatable elastomer envelope 380, that is backed up by a steel skin 382 of a solid inside mold member 384. The inflatable elastomer envelope 380 is preferably an extruded sheet having a solid exposed portion 386 against which the concrete is molded, a solid rearward portion 388 that is backed up by the steel mold skin 382, and an intermediate perforated portion 390 consisting of a series of closely spaced webs 392 which hold the solid exposed and rearward portions 386 and 388, respectively, generally uniformly spaced, with intervening passages 394 that are adapted to receive air or other fluid under pressure.

The air or other fluid pressure is introduced into the passages 394 through suitable peripheral headers on the envelope 380 (not shown), so as to hold the solid exposed molding portion 386 of the envelope generally rigidly in position when the concrete is poured and vibrated, and until the concrete has set up sufficiently to retain its shape. Shrinkage of the concrete is permitted either by the resiliency of the envelope 380, or by reducing the inflation pressure therein. Stripping is permitted by completely releasing the inflation pressure from the envelope 380.

The ceiling portion of the inside mold may be a steel skin portion 396 of the inside mold member 384, which deflects downwardly and then outwardly at the edges of the ceiling to define a notch 398, which receives an elastomer corner seal 400 that is integrally bonded to the upper edge of the elastomer envelope 380. The elastomer corner seal 400 has sufficient resiliency to accommodate the shrinkage of the concrete.

An extruded elastomer envelope or wall pad structure such as that illustrated in FIGS. 29 to 32 for accommodating the shrinkage is a honeycomb type of structure that has sufficient uniformity and predictability under internal pressure to provide close tolerance dimensions of the walls in the cast module.

While it is not entirely necessary to have the inside mold forms tapered, as aforesaid, with the use of the inflatable elastomer envelope 380 and resilient corner seal 400, nevertheless, the tapered configuration is still desirable, as it quickly frees the inside mold members as soon as they commence their downward movement, and reduces the likelihood of damage occurring to either the elastomer envelope 380 or the elastomer corner seal 400, and also the likelihood of undesirable abrasion of the inner wall surfaces of the module.

FIGS. 33 to 38 illustrate the casting of a building module 402 according to the invention, which has a slant roof 404 having inclined, overhanging eaves 406. The inside mold members 408 and 410 are the same as the solid inside mold members 240 and 242, respectively, heretofore described in connection with FIGS. 9 to 18, except for their increased height and their inclined ceiling portions. However, each of the outer mold forms generally designated 412 includes a vertically shiftable eave casting portion 414, which is supported for vertical sliding movement on the wall forming portion 416 of the outer mold form 412, the wall forming portion 416 being substantially the same in construction and operation as an outside mold member 234, described in connection with FIGS. 9 to 17. The additional vertically shiftable eave casting portion 414 of outer mold form 412 is required in order to clear the overhang of the eave before the normal lateral outward shifting of the outer mold form 412.

The eave casting portion 414 includes a downwardly extending part 418 that is slidably mounted in a pair of vertically spaced collars 420 projecting outwardly from the wall forming portion 416 of the outer mold member. A hydraulic actuator 422 is mounted on the wall forming portion 416, and is connected to the downwardly extending part 418 by means of a form lift bracket 424. The hydraulic actuator 422 shifts the eave casting portion 414 of the outer mold member between an uppermost casting position as illustrated in FIGS. 33 and 34, and a lowermost release position as illustrated in FIG. 35. It will be noted that the entire eave casting portion 414 of the outer mold member is disposed below the lower edge of the eave 406, so as to completely clear the eave 406 when the outer mold member is shifted laterally outwardly for stripping the mold members from the cast module.

A sealing strip 426 is engaged between the eave casting portion 414 and the skin of the wall forming portion 416 of the outer mold member to seal the juncture therebetween against loss of moisture from the concrete.

Figure 37:
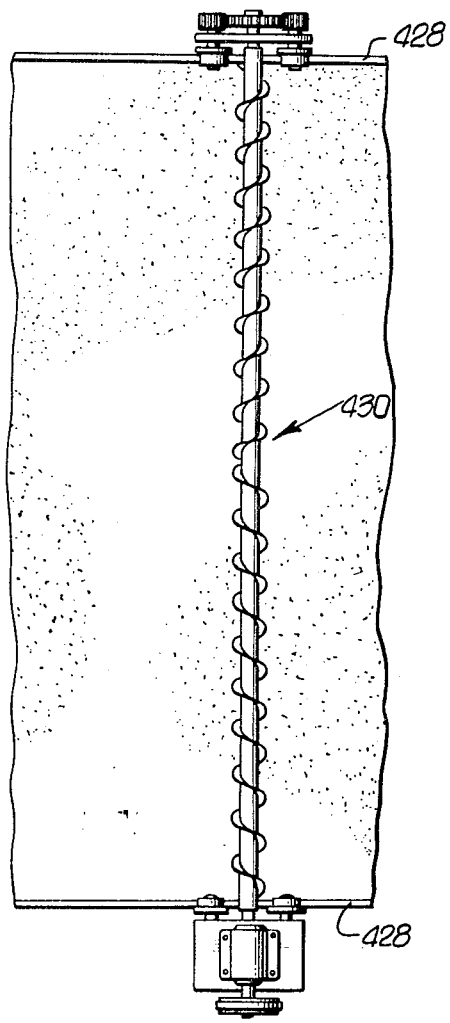
FIG. 37 is a fragmentary top plan view taken on the line 37—37 in FIG. 36, further illustrating the rotary screed distribution of the concrete on the slant roof.
Figure 38:
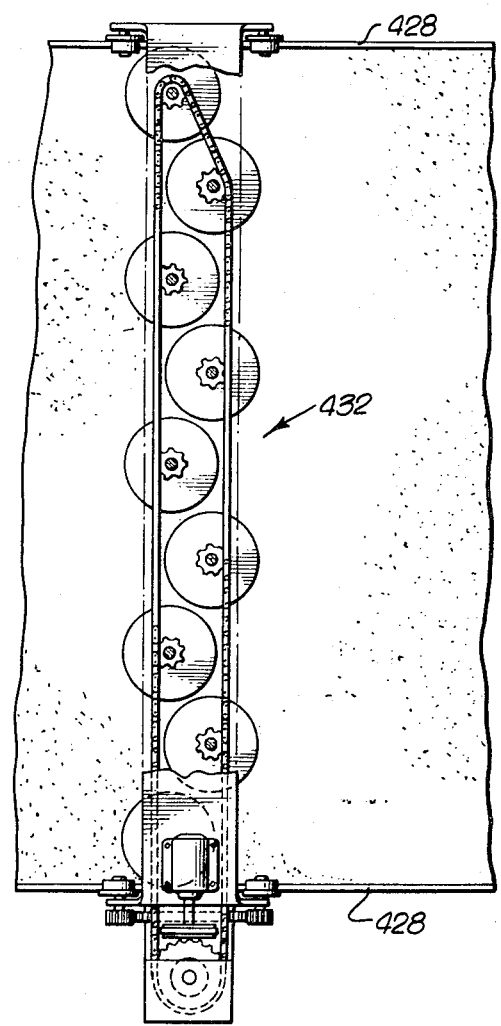
FIG. 38 is a fragmentary top plan view similar to FIG. 37, but illustrating the finishing of the concrete on the slant roof by a finish machine.
Figure 36:
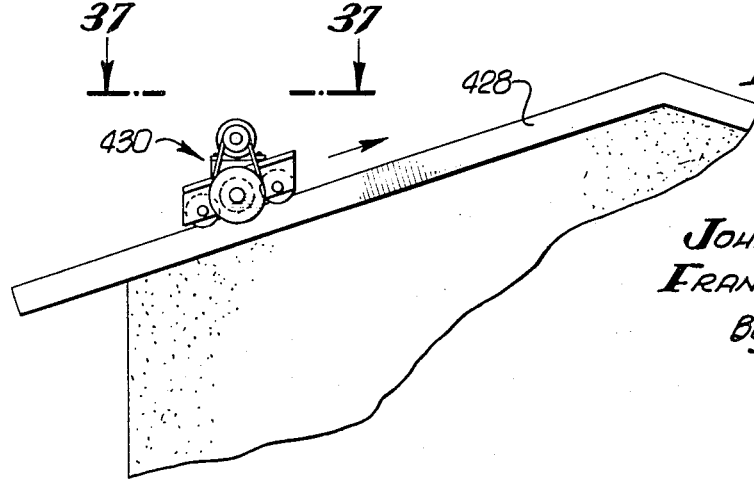
FIG. 36 is a fragmentary elevational view of the slant roof structure shown in FIG. 33, illustrating the distribution of the concrete of the slant roof by rotary screed means.

As shown in FIGS. 36 to 38, the outer mold members at the ends of the module where the overhang of the eave is straight out come up in end flanges 428 for containing the concrete of the roof at these end edges. The end flanges 428 provide tracks upon which a power driven rotary screed 430 can travel up the roof as the concrete is being poured for generally uniformly distributing the concrete over the roof area, and upon which a power driven finish machine 432 can also move over the roof to finish the concrete.

FIG. 39 diagrammatically illustrates a rough drain plumbing sub-assembly generally designated 434 suitable for central plant installation in the apartment module 12 heretofore shown and described. The sub-assembly 434 includes a main vertical drain pipe 436 having a coupling 438 adapted for connection to the similar main drain pipe of the next apartment above, which may be adapted for either solder or plastic cemented joint coupling. A horizontal pipe 440 connects the various individual outlets to the main drain pipe 436.

FIG. 40 illustrates a typical rough water inlet plumbing sub-assembly 448 suitable for installation as a unit in an apartment module such as the module 12. Sub-assembly 448 includes a main water inlet pipe 450 which connects to cold water distribution system 452, and also connects to a pipe 454 to a water heater (not shown) which has an output that connects to hot water distribution system 454.

Electrical conduit is preferably either cast into the floor-ceiling structure of the modules, or installed in molding along the lower edges of the walls, or in a combination of these ways.

FIG. 41 is a perspective view taken from the inside of a cast module 12 looking from the livingroom area 54 through the passage 66 in the interal wall 48, and showing the inside wall 52 and the inner surface of outer wall 40 in the background. FIG. 41 illustrates details of the ceiling structure, showing the parallel ceiling beams 122 depending from the intermediate web portions 120 of the ceiling, and also showing a cornice beam 124 and the manner in which it joins the ends of the ceiling beams 122 in a margin having the same depth as the ceiling beams 122.

FIGS. 41 and 42 illustrate the manner in which large sub-assemblies can be raised up into place through the open bottom of the module and anchored to the walls as a part of the assembly line production prior to shipment to the building site. Thus, an entire functional kitchen complex, generally designated 456, including such items as sink 80, stove 458, oven 460, dishwasher 462, drainboard 464, and various associated lower cabinet structures 466, are simply moved upwardly through the open bottom of module 12 with the module 12 suspended from crane 186, as best shown in FIG. 17, and then anchored to the walls 52 and 40 against which the subassembly 456 is placed, as for example, by means of a series of simple anchor brackets 468, as shown in FIG. 42. Prior to the installation of the kitchen complex sub-assembly 468, an upper cabinet sub-assembly 470 can be lifted up into the kitchen area 58 of the module and attached to the walls 40 and 52 by brackets 468, as shown in FIG. 42.

It will be apparent that any number and variety of prefabricated sub-assemblies can similarly be moved into position through the open bottoms of the modules and anchored to a wall or in the various rooms thereof, including but not limited to other cabinet structures, walk-in closet facilities, bathroom plumbing facilities such as bathtub, shower, toilet, and washbasin.

Large sub-assemblies must be custom fitted in their respective rooms with conventional building construction, and also with prior art modular building construction. A primary factor permitting the pre-installation of such units in the modules of the present invention is the close dimensional tolerance which can be uniformly held by the use of the solid inside molds of the invention, but which cannot be held with the use of break-apart inside molds or with conventional construction methods. Another factor permitting the installation of such large sub-assemblies is the completely open bottoms of the modules. Thus, the sub-assembly size is not in any way restricted by doorways or passages through which the sub-assemblies must pass as with prior art structures.

A further aspect of the invention which cooperates in the installation of large sub-assemblies such as those shown in FIG. 41, is the taper of the walls. Because of this taper, the access area at the bottom of any room cavity is larger than the corresponding upper area where the sub-assembly will be placed on the wall, whereby additional clearance is afforded for guiding the sub-assembly up into the room cavity.

Another structure which conventionally must be custom fitted is the eating bar which is provided in many new houses and apartments between the kitchen and dining areas. Such an eating bar can be completely factory installed as a sub-assembly in a module according to the present invention by suspending it from the ceiling structure.

FIG. 43 schematically illustrates the manner in which modules cast according to the present invention are uniquely adapted for overhead air conditioning and lighting without requiring the conventional drop ceilings that consume an undesirably large amount of building space and are expensive to install. FIG. 43 also illustrates the manner in which an air conditioning cavity can be cast immediately below a window according to the present invention.

Ceiling structure 470 includes spaced, parallel cornice beam 472 and ceiling beam 474 which, together with intermediate web portion 476, define an elongated ceiling cavity 478 within which air conditioning plenums 480 and lighting fixture 482 are disposed. This equipment can be supported in the cavity 478 by securing suitable support panels 484 to the bottom surfaces of the beams 472 and 474 by a series of screw fastener devices 486 having receptacle portions cast into the ceiling. Hot air is piped into one of the plenums 480, and cold air into the other plenum 480, and the flow of hot and cold air into the room is modulated by thermostatic control means 488, schematically illustrated in FIG. 44. This control means 488 controls the opening and closing of a pair of hot and cold air valves 490, so as to let a substantially constant flow of air into the room and vary the proportions of hot and cold air in this flow to keep a substantially constant room temperature. The control means 488, shown in FIG. 44, is conventional and includes a thermostat 492 and a reversing relay 494 which are arranged to control the flow of control air to and from theair actuated valves 490.

It will be understood that any number of the ceiling cavities 478, either between adjacent ceiling beams 474 or between a beam 474 and a cornice beam 472, may have the air conditioning and lighting equipment disposed therein generally as illustrated in FIG. 43, and that those cavities 478 which do not contain such equipment may simply be covered by flat panels such as the panels 484, so as to produce a substantially flush ceiling effect generally similar to that of the conventional drop ceiling, but much more uniform and much less complicated and costly than the conventional drop ceiling.

Horizontal ducts leading to and from the ends of the plenums 480 may be cast in edge portions of the ceiling structure 470 by outer mold blockout members similar to blockout member 362 shown in FIG. 26 and described in connection therewith.

If desired, an air conditioning cavity 496 can be cast immediately below a window aperture 498 for placement of an air conditioner housing 500 directly below the window aperture 498. A vertical separator panel 502 divides the lower portion of housing 500 into separate chambers 504 and 506, one of which receives hot air and the other of which receives cold air through respective ducts which can be cast into the lower edge or ends of the wall. Air valves 490, thermostatically controlled by apparatus such as that schematically shown in FIG. 44, are disposed in the upper parts of the respective chambers 504 and 506 for modulating the flow of hot and cold air into a mixing chamber 508 in the upper part of the housing 500, from which the air is directed through directional grill 510, so as to sweep upwardly along the inner surface of the window 512. In this way, if the temperature outside is lower than that inside the room, warm air sweeping the window will directly take the heat loss of the window. Conversely, if the external temperature is warmer than that inside the room, cool air sweeping the window will directly take the heat gain transmitted through the window so as to maintain the entire volume of the room at a substantially constant temperature.

Figure 16:
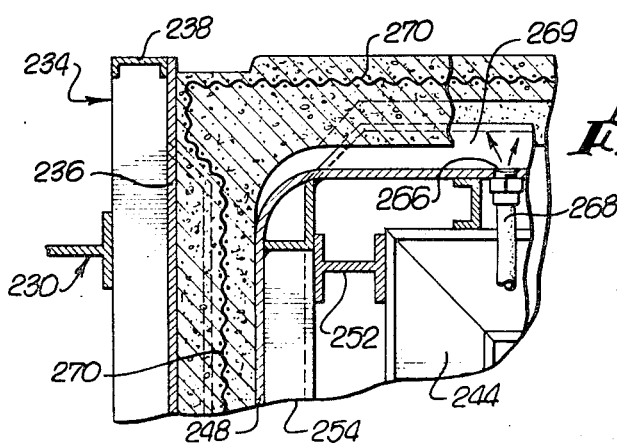
FIG. 16 is an enlarged, fragmentary, vertical section similar to FIG. 10, but illustrating the relationship between the cast concrete structure and an internal mold member after the mold member has shifted downwardly relative to the cast structure to provide clearance for shrinkage of the cast structure.

FIG. 45 of the drawings is similar to FIG. 16, illustrating the same molding apparatus but with the addition of a resilient, elastomeric diaphragm preferably in the form of a rubber sheet on the order of from about ⅛ inch to about ¼ inch thick which completely covers the top surface of the mold skin 248 of the inside mold member 240. This rubber sheet 514 is preferably heat formed to the configuration of the skin 248 at the top of mold member 240. The entire periphery 516 of the rubber sheet 514 is bonded to the mold skin 248, preferably at the corners of the inside mold member 240 where the mold member 240 curves downwardly from its top surface of its side surfaces. This peripheral bonding can be accomplished by cementing the edge portion of the sheet 514 to the metal mold skin 248, or by other conventional bonding means, and this peripheral bond is such as to be completely air tight.

The elastomeric diaphragm 514 serves two important functions in the molding process: first, it provides a completely sealed air chamber for the cushion of air injected through hoses 268 and nozzles 266 to assure that the desired pressure is maintained under the ceiling structure to compensate for the weight of the ceiling structure when the inside mold member 240 is dropped to accommodate shrinkage of the concrete. The flexibility of the rubber diaphragm 514 assures uniform application of this pressure to the under surface of the ceiling structure, while the peripheral seal prevents any air from leaking out of the chamber 518 between the upper mold skin 248 and the diaphragm 514.

The second important function of the elastomeric diaphragm 514 is to assist in stripping the inside mold member 240 from the freshly cast module. A preferred concrete mix for stripping will have a pasty or slimy surface constituency which is the last portion of the concrete to set up. While this surface characteristic of the concrete tends to facilitate relative sliding movement between the mold skin and the cast concrete, nevertheless, it tends to provide a complete seal against the travel of air, whereby it becomes difficult to break a rigid inside mold skin away from the damp surface of the ceiling. However, with the rubber diaphragm 514 installed as illustrated in FIG. 45, when the inside mold member 240 starts to lower, the corner portions of the mold member proximate where the periphery 516 of the diaphragm is attached are free to break away while the mainbody of the diaphragm 514 is still adhered to the concrete of the ceiling, as illustrated in FIG. 45. Then, as stripping proceeds, the elastic diaphragm simply pulls away from the ceiling further and further from the edges along a stripping line 520. This makes the stripping action much simpler and cleaner, and in experimental practice it has been found that with the addition of this elastomeric diaphragm 514 the overall productivity of a module production plant is substantially increased.

FIG. 46 illustrates an alternative form of module 522 according to the invention wherein the ceiling structure instead of being a full ceiling integrally cast with the depending wall structure, comprises cornice beam means extending along the upper edges of the walls, and separate ceiling slabs disposed on the cornice beam means and welded thereto by means of cast-in place weld plates.

A module 522 as illustrated in FIG. 46 includes tapered wall means including an inside wall 524, and ceiling structure generally designated 526 which includes both integrally cast cornice beam means and separately cast ceiling slabs disposed thereon and welded thereto. Thus, the ceiling structure 526 associated with an internal wall 524 includes a pair of cornice beams 530 integrally cast with the upper edge of the wall 524 and projecting laterally from opposite sides of the wall, each of the cornice beams 530 including suitable rebar reinforcement 532. Weld plate 534 is integrally cast into the upper surface defined by the upper edge of wall 524 and by the cornice beams 530, being suitably anchored therein.

It is to be understood that while the internal wall 524 preferably has a pair of the cornice beams 530 integrally cast therewith, an external wall of the module will have only a single, inwardly directed cornice beam 530 cast therewith.

Accordingly, the monolithic casting forming a part of the module 522 comprises ceiling structure in the nature of cornice beams and the integrally associated upper edges of the walls, and integral, depending wall structure extending downwardly from this cornice structure.

The ceiling structure generally designated 526 is completed by a ceiling slab 536 that is disposed in covering relationship over each room cavity, the peripheral portions of the ceiling slabs 536 overlapping the corresponding cornice beams 530 and being welded thereto. Preferably, each of the ceiling slabs 536 includes a peripheral beam 538 extending around the entire periphery of the slab 536, with a relatively thin web portion 540 forming the major body of each ceiling slab 536, the web 540 having a series of regularly spaced, parallel beams 542 depending therefrom and extending across the entire width of the ceiling slab, the beams 542 merging into the peripheral beams 538 at their ends.

A peripheral lip 544 on each ceiling slab 536 overlaps the cornice beam 530 and is provided with an angle weld plate 546 which is welded to the cornice weld plate 534 through spaced rod sections 548 for accommodating variations in spacing.

As illustrated in FIG. 46, the modules 522 are adapted to be secured together in stacked relationship, with the free lower edge of a wall 524 of an upper module seating in the channel defined between the peripheral edges of ceiling slabs 536. A channel weld plate 550 integrally cast along the lower edge of the wall 524 is adapted to be welded at the corners thereof to the weld plate 534, with intermediate rod sections 548 allowing for variations in spacing.

The upper edges of the cornices 530 are preferably chamfered or beveled to provide an upwardly and outwardly facing inclined surface 552 on each of the cornice beams 530, and the peripheral beams 538 on the ceiling slabs 536 preferably have complementary downwardly and outwardly facing inclined surfaces 554. Preferably, a series of elastomer pads made of Neoprene or the like are disposed between the peripheral lip portions 544 of the ceiling slabs and the cornice beams, and also between the free lower edges of the walls 524 of an upper module and the upwardly facing integrally cast ceiling structure of the module immediately below, for self-adjustment and equalization of the bearing forces, and when the parts are welded together the round rod sections 548 adapt to the various self-adjusted spacings. The space then defined between the inclined cornice surfaces 552 and the opposed inclined ceiling slab surfaces 554, between the generally horizontal upper cornice surfaces and the opposed downwardly facing horizontal surfaces of the peripheral lips 544 of the ceiling slabs, and the spaces immediately alongside of and underneath the free lower edge of the upper module wall 524, are filled with grout which will take the various bearing loads.

The opposed inclined cornice surfaces 552 and ceiling slab surfaces 554 apply the ceiling slab loading to the strong peripheral beam portions 538 of the ceiling slabs, both vertically and horizontally.

With the alternative construction illustrated in FIG. 46 for the module 522, the ceiling structure may be considered as consisting of both the integrally cast cornice beams 530 and the separately cast ceiling slabs 536 which are peripherally welded to the cornice beams 530 to complete the ceiling structure.

The solid inside molde are employed in casting the modules 522 for all of the reasons set forth in detail hereinabove in connection with the casing of the modules having the inegrally cast full ceiling structures, and additionally because close tolerances are required in the cornice beams 530 to assure that the ceiling slabs 536 will fit the apertures defined by the cornice beams 530. The various means described hereinabove in detail for accommodating the shrink of the concrete are also equally adaptable to casting of the modules 522, including the tapered inside mold members, the fiber glass sheaths, and the inflatable elastomeric skins described in detail hereinabove.

The alternative embodiment illustrated in FIG. 46 has the advantage over the full ceiling casting of permitting earlier stripping from the mold, thereby permitting substantially increased production rate from the mold. The ceiling slabs 536 can be cast flat, and a plurality of the ceiling slabs can be simultaneously cast, so that they can be allowed any desired curing time before being combined with the modules. This allows considerable variety in ceiling construction, permitting the ceilings to be made lighter in weight, and allowing such features as post-tensioning, and hollow cores for improved acoustic quality.

Not only is the close tolerance production of the modules 522 that is permitted by use of solid inside mold members important for correct fitting of the ceiling slabs 536, but it is also an important factor in permitting the modules 522 to be stacked for multi-story building structures with a maximum of strength and a minimum of shimming or other adjustment required. This same advantage, of course, holds true for the full ceiling type modules according to the present invention.

The molding apparatus and method of the present invention permits the concrete to in effect be mixed right inside of the mold cavity instead of requiring that the concrete be batched and then poured into the mold cavity. This is accomplished by filling the mold cavity full of aggregate and then vibrating the mold so that the dry aggregate is packed tightly in the mold, then, the aggregate is held down in place in the mold by rigid perforated covering means (not shown) extending over the top of the mold cavity, and concrete slurry is injected into the mold through a series of suitable ports in the bottom of the mold, which in this case is along the parts of the mold cavity proximate the lower free edges of the walls to be cast, the slurry being forced up through the packed aggregate until the aggregate is completely covered with the slurry. What is referred to here as a concrete slurry is actually any suitable liquid binder for the aggregate, which will normally include a variety of ingredients such as Portland cement, epoxy resin, latex, and the like. It has been found in experimental casting according to this procedure that the amount of sand required in the concrete can be greatly reduced by this means, to on the order of only about 10% of the sand required when the concrete is batched and poured. With the present procedure wherein the aggregate is vibrated into place in the mold cavity and in effect injected with the liquified binder, a small amount of fine sand is embodied in the liquified binder to keep it broken up and flowable.

By thus pre-filling the mold cavity with aggregate and injecting the binder, it has been found in experimental practice that a much higher percentage of aggregate can be provided in the cast concrete module, on the order of 30% more aggregate than can be provided by batching and pouring. By this procedure as much as 40% or more of the weight of the concrete can be eliminated from the cast modules, resulting in a much greater strength-to-weight ratio.

Although the present method and apparatus, and also the resulting modules, have been described herein principally in connection with the use of conventional concrete of the type which shrinks when it sets up, it is to be understood that many of the advantages of the invention also apply with the use of concrete of the type which expands when it sets up. Accordingly, it is to be understood that the present invention is not limited to the use of concrete of the type that shrinks, but applies to the use of any type of concrete.

Although we have herein shown and described our invention in what we have conceived to be the most practical and preferred embodiments, it is recognized that departures may be made therefrom within the scope of our invention, which is not to be limited to the details disclosed herein.

We claim:

1. The method of casting a concrete habitable building module having substantially vertical walls which comprises introducing unset concrete into a mold, defining full height room wall portions and ceiling portions of at least one full height habitable room of said module in said mold while the concrete is still in its unset condition, sustaining said full room height wall portions against inward distortion while the concrete thereof remains in its unset condition by the application of generally rigidly unyielding and continuous outwardly directed forces thereagainst applied by generally rigid inside mold means having generally continuous skin means that is substantially imprevious to air and water, and accommodating for a sudbstantial amount of size change of the concrete as it sets up by laterally adjusting said skin means without interrupting the continuity thereof while providing support for said celing portions.

2. The method of claim 1, wherein said ceiling portion of said one room cavity comprises a substantially full ceiling extending over the room cavity.

3. The method of claim 1, wherein said ceiling portion of said one room cavity comprises cornice structure along the upper edge of said wall portion and defining a ceiling opening adapted to be covered by a separately cast ceiling slab.

4. The method of claim 1, wherein said lateral adjustment of said skin means is accomplished by having the wall defining portions of said skin means of the inside mold member tapered, and shifting said inside mold member relative to the module in a direction generally parallel to the wall portions of the module.

5. The method of claim 4, wherein the wall defining portions of said skin means taper inwardly from bottom to top, and said inside mold member is shifted downwardly relative to the module.

6. The method of claim 5, wherein said ceiling portion of said one room cavity comprises a substantially full ceiling, and wherein an elastomeric diaphragm is disposed over the top of the inside mold member and peripherally bonded but otherwise loosely secured thereto, fluid being admitted between the diaphragm, and top of the inside mold as the inside mold shifts downwardly relative to the module allowing the diaphragm to strip away from the ceiling from its periphery inwardly toward the center thereof to gradually break the seal between the inside mold member and the ceiling.

7. The method of claim 5, wherein said ceiling portion of said one room cavity comprises a substantially full ceiling, and wherein the weight of the ceiling is at least partially counterbalanced during a further curing interval when the inside mold member is shifted downwardly relative to the module by introducing fluid pressure between the inside mold member and the ceiling.

8. The method of claim 7, wherein the weight of the ceiling is substantially completely counterbalanced by said fluid pressure.

9. The method of claim 7, wherein said fluid pressure is air pressure.

10. The method of claim 7, wherein said fluid pressure is encapsulated within an elastomeric diaphragm extending in covering relationship over the ceiling surface defining portion of said skin means and peripherally sealed thereabout.

11. The method of claim 5, wherein said ceiling portion of said one room cavity comprises a substantially full ceiling, and wherein the weight of the ceiling is at least partially counterbalanced during a further curing interval when the inside mold member is shifted downwardly relative to the module by casting a plurality of parallel, regularly spaced rebar truss structures into the ceiling so as to extend substantially completely across the ceiling between opposite walls, the rebar truss structures each being disposed generally in a vertical plane.

12. The method of claim 5, wherein said taper for each wall surface defining portion of said skin means is on the order of about one-half inch lateral offset for about eight feet of height.

13. The method of claim 1, wherein said lateral adjustment of said skin means is accomplished by associating generally vertically arranged elastomeric sheet means with said inside mold means, resiliency of said elastomeric sheet means allowing the spacing between opposed wall portions of the cast module to adjust as the concrete sets up.

14. The method of claim 13, wherein said elastomeric sheet means is inflatable and is arranged to cover rigid side portions of the inside mold member with said elastomer sheet means comprising the wall defining portions of said skin means of the inside mold member, said elastomer sheet means being adjustable between different conditions of lateral adjustment by varying the fluid pressure condition therein, introducing the concrete into the mold with elastomer sheet means in a first condition of lateral adjustment, and varying the fluid pressure condition in said elastomer sheet means so that the latter is in a second condition of lateral adjustment after the concrete has set to substantial structural stability but before substantial size change has occurred in the concrete from partial curing thereof.

15. The method of claim 14, wherein said first condition of lateral adjustment is an extended position with a corresponding relatively high fluid pressure condition in said elastomer sheet means, and said second condition of lateral adjustment is a retracted position with a corresponding relatively low fluid pressure condition in said elastomer sheet means.

16. The method of claim 1, wherein the outside walls of the module are cast between said inside mold means and a plurality of outer mold forms which are laterally shiftable between a closed, casting position wherein they come together in substantially air and moisture sealed interengagement and an open release position wherein they are spaced substantially laterally outwardly from the outside walls of a module cast in the mold, the module being separated from said inside mold means by downward movement of the inside mold means relative to the module out of said room cavity so as to vertically clear the module, and the module being separated from said outer mold forms by first the lateral outward shifting of said outer mold forms from said casting position to said release position and then downward movement of the outer mold forms relative to the module so as to vertically clear the module, reinforcement being introduced into the wall of the module by suspending wire mesh sheet reinforcing material from above the mold down into the wall cavity portions of the mold and introducing the concrete into the wall cavity portions of the mold with said reinforcing material thus suspended.

17. The method of claim 1, wherein the outside walls of the module are cast between said inside mold means and a plurality of outer mold forms which are laterally shiftable between a closed, casting position wherein they come together in substantially air and moisture sealed interengagement and an open release position wherein they are spaced substantially laterally outwardly from the outside walls of a module cast in the mold, the module being separated from said inside mold means by downward movement of the inside mold means relative to the module out of said room cavity so as to vertically clear the module, and the module being separated from said outer mold forms by first the lateral outward shifting of said outer mold forms from said casting position to said release position and then downward movement of the outer mold forms relative to the module so as to vertically clear the module, outwardly opening lateral recess means being cast into at least one outside wall of the module by the complementary laterally inwardly projecting means disposed on the corresponding outer mold form being laterally shifted a sufficient distance toward its said release position to completely withdraw said inwardly projecting means from said lateral recess means to provide clearance for downward movement of said outer mold form relative to the cast module.

18. The method of claim 17, wherein said laterally inwardly projecting means extends inwardly the thickness of the wall so as to provide an aperture in the wall.

19. The method of claim 18, wherein said aperture is a window aperture.

20. The method of claim 17, wherein said laterally inwardly projecting means extends inwardly only part of the thickness of the wall.

21. The method of claim 20, wherein a series of said lateral recesses are cast in regularly spaced side-by-side relationship along the wall by a corresponding series of lateral projections on the outer mold form, said lateral projections defining generally straight, vertically oriented spaces therebetween to cast a series of regularly spaced pilasters in the wall between adjacent pairs of said recesses.

22. The method of claim 20, wherein said laterally inwardly projecting means is the complement of wall surface texturing, whereby to cast surface texturing into the wall.

23. The method of claim 22, wherein authentic wall surface texturing is duplicated on the cast module by employing a liquid elastomeric substance which will set up into a generally solid, resilient consistency to mold an elastomeric sheet directly against an authentic wall surface material and thereby embody the complement of said wall surface material on one surface of said elastomeric sheet, adhesively bonding said elastomeric sheet to the inwardly facing surface of the outer mold form with said one surface of the elastomeric sheet exposed, and then introducing the concrete of the module into the mold cavity.

24. The method of claim 23, wherein said elastomeric sheet is a soft silicone rubber.

25. The method of claim 23, wherein said elastomeric sheet is releasably bonded to the outer mold form so as to separate therefrom and remain attached to the module when the outer mold form is shifted laterally for separation of the module therefrom, and then the elastomeric sheet is stripped from the module.

26. The method of claim 23, wherein said surface texturing is brick.

27. The method of claim 23, wherein said surface texturing is rustic wood.

28. The method of claim 1, wherein the outside walls of the module are cast between said inside mold means and a plurality of outer mold forms which are laterally shiftable between a closed, casting position wherein they come together in substantially air and moisture sealed interengagement and an open release position wherein they are spaced substantially laterally outwardly from the outside walls of a module cast in the mold, the module being separated from said inside mold means by downward movement of the inside mold member relative to the module out of said room cavity so as to vertically clear the module, and the module being separated from said outer mold forms by first the lateral outward shifting of said outer mold forms from said casting position to said release position and then downward movement of the outer mold forms relative to the module so as to vertically clear the module after the cast module has been separated from the mold the walls thereof being placed under vertical compression so as to permit safe moving and handling of the module during an early portion of the curing cycle of the concrete.

29. The method of claim 1, wherein the outside walls of the module are cast between said inside mold means and a plurality of outer mold forms which are laterally shiftable between a closed, casting position wherein they come together in a substantially air and moisture sealed interengagement and an open release position wherein they are spaced substantially laterally outwardly from the outside walls of a module cast in the mold, the module being separated from said inside mold means by downward movement of the inside mold member relative to the module out of said room cavity so as to vertically clear the module, and the module being separated from said outer mold forms by first the lateral outward shifting of said outer mold forms from said casting position to said release position and then downward movement of the outer mold form relative to the module so as to vertically clear the module, slant eave means being cast in overlapping relationship to at least one outside wall of the cast module, and at least an upper portion of the corresponding outside mold form being moved downwardly to clear said eave means before such outside mold form is shifted laterally outwardly.

30. The method of claim 1, wherein the outside walls of the module are cast between said inside mold means and a plurality of outer mold forms which are laterally shiftable between a closed, casting position wherein they come together in substantially air and moisture sealed interengagement and an open release position wherein they are spaced substantially laterally outwardly from the outside walls of a module cast in the mold, the module being separated from said inside mold means by downward movement of the inside mold member relative to the module out of said room cavity so as to vertically clear the module, and the module being separated from said outer mold forms by first the lateral outward shifting of said outer mold forms from said casing position to said release position and then downward movement of the outer mold forms relative to the module so as to vertically clear the module, a door aperture being cast into a wall of the module by disposing, prior to introduction of the concrete into the mold, a door jamb in the general shape of an inverted U between a pair of wall-forming mold surfaces with the free ends of the legs of the U extending downwardly substantially to the bottom of the wall-forming mold cavity, providing a substantially water-tight seal between said door jamb and said pair of surfaces, and removing said seal after the concrete has set, but leaving the door jamb cast in place in the wall.

References Cited

UNITED STATES PATENTS

| | | | |
|---|---|---|---|
| 3,107,158 | 10/1963 | Ahlberg | 264—314 X |
| 3,347,966 | 10/1967 | Seefluth | 264—335 X |
| 2,778,533 | 1/1957 | Savary | 18—42 D |
| 2,543,939 | 3/1951 | Rumble | 52—745 X |
| 3,297,295 | 1/1967 | Haas | 25—130 B X |
| 2,850,785 | 9/1958 | Rushing | 264—335 |
| 205,731 | 7/1878 | Daniels | 25—130 B |
| 1,402,845 | 1/1922 | Downer | 25—130 B |
| 1,894,676 | 1/1933 | Dresser | 264—33 X |
| 3,539,146 | 11/1970 | Smith | 25—130 B X |
| 2,616,146 | 11/1952 | Haase | 25—130 B |
| 2,557,631 | 6/1951 | Callan | 25—131 W X |
| 3,426,122 | 2/1969 | Gaudelli et al. | 264—336 X |
| 2,316,143 | 4/1943 | Peebles | 264—313 X |
| 2,313,110 | 3/1943 | Wertz | 264—36 |

ROBERT F. WHITE, Primary Examiner

J. R. THURLOW, Assistant Examiner

U.S. Cl. X.R.

52—745; 264—219, 250, 314, 333, 335, DIG. No. 43